US009716920B2

United States Patent
Chen et al.

(10) Patent No.: US 9,716,920 B2
(45) Date of Patent: Jul. 25, 2017

(54) SIGNALING ATTRIBUTES FOR NETWORK-STREAMED VIDEO DATA

(75) Inventors: Ying Chen, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1302 days.

(21) Appl. No.: 13/154,247

(22) Filed: Jun. 6, 2011

(65) Prior Publication Data

US 2012/0033037 A1 Feb. 9, 2012

Related U.S. Application Data

(60) Provisional application No. 61/371,125, filed on Aug. 5, 2010.

(51) Int. Cl.
*H04N 13/00* (2006.01)
*H04N 21/81* (2011.01)
*H04N 21/218* (2011.01)
*H04N 21/235* (2011.01)
*H04N 21/2365* (2011.01)
(Continued)

(52) U.S. Cl.
CPC ......... *H04N 21/816* (2013.01); *H04N 19/597* (2014.11); *H04N 19/70* (2014.11); *H04N 21/21805* (2013.01); *H04N 21/235* (2013.01); *H04N 21/2365* (2013.01); *H04N 21/435* (2013.01); *H04N 21/6125* (2013.01); *H04N 21/6581* (2013.01); *H04N 21/84* (2013.01)

(58) Field of Classification Search
CPC ....... H04N 19/00769; H04N 19/00884; H04N 21/21805; H04N 21/235; H04N 21/2365; H04N 21/435

USPC ......................................................... 348/43
See application file for complete search history.

(56) References Cited

U.S. PATENT DOCUMENTS

2005/0185823 A1  8/2005  Brown et al.
2008/0095228 A1  4/2008  Hannuksela et al.
(Continued)

FOREIGN PATENT DOCUMENTS

CN  101416519 A  4/2009
CN  101548548 A  9/2009
(Continued)

OTHER PUBLICATIONS

Engin Kurutepe et al: "A standards-based, flexible end to end multiview video streaming architecture", Packet Video 2007, IEEE, PI, Nov. 1, 2007 (Nov. 1, 2007), pp. 302-307, XP031170627, DOI:10.1109/Packet.2007.4397054 ISBN: 978-1-4244-0980-8 section "B.SDP Extensions for Multiview Video".
(Continued)

*Primary Examiner* — Nguyen Truong
(74) *Attorney, Agent, or Firm* — Shumaker & Sieffert, P.A.

(57) ABSTRACT

In one example, an apparatus includes a processor configured to receive video data for two or more views of a scene, determine horizontal locations of camera perspectives for each of the two or more views, assign view identifiers to the two or more views such that the view identifiers correspond to the relative horizontal locations of the camera perspectives, form a representation comprising a subset of the two or more views, and, in response to a request from a client device, send information indicative of a maximum view identifier and a minimum view identifier for the representation to the client device.

46 Claims, 8 Drawing Sheets

(51) Int. Cl.
    H04N 21/435    (2011.01)
    H04N 21/61     (2011.01)
    H04N 21/658    (2011.01)
    H04N 21/84     (2011.01)
    H04N 19/597    (2014.01)
    H04N 19/70     (2014.01)

(56) References Cited

U.S. PATENT DOCUMENTS

| | | |
|---|---|---|
| 2008/0285863 A1 | 11/2008 | Moon et al. |
| 2010/0166062 A1 | 7/2010 | Perlman et al. |
| 2010/0259595 A1 | 10/2010 | Trimeche et al. |
| 2010/0271465 A1 | 10/2010 | Lee et al. |
| 2012/0036544 A1 | 2/2012 | Chen et al. |
| 2013/0147914 A1 | 6/2013 | Park et al. |

FOREIGN PATENT DOCUMENTS

| | | |
|---|---|---|
| WO | 2007126508 A2 | 11/2007 |
| WO | 2010041998 A1 | 4/2010 |
| WO | 2010041999 A1 | 4/2010 |
| WO | 2010085361 A2 | 7/2010 |

OTHER PUBLICATIONS

Ilkwon Park et al: "Interactive Multi-View Video and View-Dependent Audio Under MPEG-21 DIA (Digital Item Adaptation)", 3DTV Conference, 2007, IEEE, PI, May 1, 2007 (May 1, 2007), pp. 1-4, XP031158173, ISBN: 978-1-4244-0721-7 abstract.

Xun Cao, Yebin Liu, Qionghai Dai: "A flexible client-driven 3dtv system for real-time acquisition, transmission, and display of dynamic scenes" "EURASIP Journal on Advances in Signal Processing, vol. 2009, 2009, XP002663404, DOI: 10.1155/2009/351452 p. 5, paragraph 1".

International Search Report and Written Opinion—PCT/2011/046481—ISAEPO—Nov. 30, 2011.

ITU-T H.264, Series H: Audiovisual and Multimedia Systems, Infrastructure of audiovisual services—Coding of moving video, Advanced video coding for generic audiovisual services, Prepublished version, Mar. 2010, 669 pp.

McCann et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Dresden, Germany, Apr. 15-23, 2010, 42 pp.

Vetro et al., "Joint Draft 8.0 on Multiview Video Coding," Joint Video Team (JVT) of ISO/IEC MPEG & ITU-T VCEG (ISO/IEC JTC1/SC29/WG11 and ITU-T SG16 Q.6), 28th Meeting: Hannover, Germany, Jul. 20-25, 2008, 63 pp.

Sullivan et al., Editors' draft revision to ITU-T Rec. H.264, ISO/IEC 14496-10 Advanced Video Coding—in preparation for ITU-T SG 16 AAP Consent (in integrated form), Joint Video Team (JVT) of ISO/IEC MPEG & ITU-T VCEG (ISO/IEC JTC1/SC29/WG11 and ITU-T SG16 Q.6) 30th Meeting: Geneva, Switzerland, Jan. 29-Feb. 3, 2009, 684 pp.

Vetro et al., "Overview of Multiview Video Coding and Anti-Aliasing for 3D Displays," Mitsubishi Electric Research Labs, Department of Computer Science and Engineering, IEEE 2007, ICIP 2007, 4 pp.

Fielding et al., "Hypertext Transfer Protocol—HTTP/1.1," Network Working Group, RFC 2616, Jun. 1999, 165 pp.

Stockhammer et al., "WD 0.1 of 23001-6 Dynamic Adaptive Streaming over HTTP (DASH)," International Organisation for Standardisation, ISO/IEC JTC1/SC29/WG11, Coding of Moving Pictures and Audio, MPEG2010 Geneva, Jan. 6, 2011, 16 pp.

Wenger et al., "RTP Payload Format for H.264 Video," Network Working Group, RFC 3984, Feb. 2005, 84 pp.

U.S. Appl. No. 13/154,285, entitled "Signaling Attributes for Network-Streamed Video Data," by Ying Chen et al., filed Jun. 6, 2011.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

International Preliminary Report on Patentability—PCT/US2011/046481—The International Bureau of WIPO Geneva, Switzerland, Jan. 15, 2013, 7 pp.

Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD3: Working Draft 3 of High-Efficiency Video Coding," Document JCTVC-E603, 5th Meeting: Geneva, CH, Mar. 16-23, 2011, 193 pp.

Second Written Opinion of international application No. PCT/US2011/046481, dated Oct. 18, 2012, 6 pp.

Non-final Office Action from U.S. Appl. No. 13/154,285, dated Sep. 5, 2013, 26 pp.

"Text of ISO/IEC 14496-12:2008/PDAM 2 & ISO/IEC 15444-12:2008/PDAM 2 Sub-track selection & switching", Mpeg Meeting; Jan. 18-22, 2010; Kyoto; (Motion Picture Expertgroup or ISO/IEC JTC1/SC29/WG11), No. N11137, XP030017634, ISSN: 0000-0030, 138 pp.

Lee, "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.

Stockhammer, et al, "WD 0.1 of 23001-6 Dynamic Adaptive Streaming over HTTP (DASH)," ISO/IEC JTC1/SC29/WG11, MPEG2010 Geneva/m11398, Jul. 30, 2010, 16 pp.

Kimata H., et al., "Low Delay Multi-View Video Coding for Free-Viewpoint Video Communication," Transactions of IEICE, Japan, The Institute of Electronics, Information Andommunication Engineers (IEICE), Jan. 2006, vol. J89-D, No. 1, 2 pages (English Abstract).

Kimata H., et al., "Low Delay Multi-View Video Coding for Free-Viewpoint Video Communication," Transactions of IEICE, Japan, The Institute of Electronics, Information Andommunication Engineers (IEICE), Jan. 2006, vol. J89-D, No. 1, 17 pages.

SIGNALING ATTRIBUTES FOR NETWORK-STREAMED VIDEO DATA

This application claims the benefit of U.S. Provisional Application No. 61/371,125, filed Aug. 5, 2010, which is hereby incorporated by reference in its entirety.

CROSS-REFERENCE TO RELATED APPLICATIONS

The present Application for Patent is related to the following U.S. patent application: "SIGNALING ATTRIBUTES FOR NETWORK-STREAMED VIDEO DATA" by Chen et al., having application Ser. No. 13/154,285, filed concurrently herewith, assigned to the assignee hereof, and expressly incorporated by reference herein.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

Efforts have been made to develop new video coding standards based on H.264/AVC. One such standard is the scalable video coding (SVC) standard, which is the scalable extension to H.264/AVC. Another standard is the multi-view video coding (MVC), which has become the multiview extension to H.264/AVC. A joint draft of MVC is in described in JVT-AB204, "Joint Draft 8.0 on Multiview Video Coding," 28th JVT meeting, Hannover, Germany, July 2008, available at http://wftp3.itu.int/av-arch/jvt-site/2008_07_Hannover/JVT-AB204.zip. A version of the AVC standard is described in JVT-AD007, "Editors' draft revision to ITU-T Rec. H.264|ISO/IEC 14496-10 Advanced Video Coding—in preparation for ITU-T SG 16 AAP Consent (in integrated form)," 30th JVT meeting, Geneva, CH, February 2009," available from http://wftp3.itu.int/av-arch/jvt-site/2009_01_Geneva/JVT-AD007.zip. This document integrates SVC and MVC in the AVC specification.

SUMMARY

In general, this disclosure describes techniques for storage and transport of video data. This disclosure provides techniques for signaling attributes for coded video data conforming to 3D video representation standards, e.g., multiview video coding (MVC), and for streaming the coded video data over a network, e.g., according to hypertext transport protocol (HTTP) streaming. The attributes may be included as part of the manifest of a video service, which may be transmitted before a client starts playing any specific video representation, such that the client may use the attributes to adjust 3D perception, e.g., view angle/position, by selecting 3D video representations with different attributes. The attributes may describe locations of camera perspectives for multiple views of coded video data. For example, view identifiers may be assigned according to the locations of the camera perspectives. The attributes may also describe a maximum number of views in a representation that can be targeted for output, and in some examples, views assigned to one or more operation points for one or more representations.

In one example, a method of signaling information for video data includes receiving, for multimedia content, video data for two or more views of a scene, determining horizontal locations of camera perspectives for each of the two or more views, assigning view identifiers to the two or more views such that the view identifiers correspond to the relative horizontal locations of the camera perspectives, forming a representation of the multimedia content, the representation comprising a subset of the two or more views, and sending information, as part of a manifest of the representation of the multimedia content, indicative of a maximum view identifier and a minimum view identifier for the representation to the client device.

In another example, an apparatus for signaling information for video data includes a processor configured to receive, for multimedia content, video data for two or more views of a scene, determine horizontal locations of camera perspectives for each of the two or more views, assign view identifiers to the two or more views such that the view identifiers correspond to the relative horizontal locations of the camera perspectives, form a representation of the multimedia content, the representation comprising a subset of the two or more views, and send information, as part of a manifest of the representation of the multimedia content, indicative of a maximum view identifier and a minimum view identifier for the representation to the client device.

In another example, an apparatus for signaling information for video data includes means for receiving, for multimedia content, video data for two or more views of a scene, means for determining horizontal locations of camera perspectives for each of the two or more views, means for assigning view identifiers to the two or more views such that the view identifiers correspond to the relative horizontal locations of the camera perspectives, means for forming a representation of the multimedia content, the representation comprising a subset of the two or more views, and means for sending information, as part of a manifest of the representation of the multimedia content, indicative of a maximum view identifier and a minimum view identifier for the representation to the client device.

In another example, a computer program product includes a computer-readable storage medium comprises instructions that, when executed, cause a processor of a source device for signaling information for video data to receive, for multimedia content, video data for two or more views of a scene, determine horizontal locations of camera perspectives for each of the two or more views, assign view identifiers to the two or more views such that the view identifiers correspond to the relative horizontal locations of the camera perspectives, form a representation of the multimedia content, the representation comprising a subset of the two or more views, and send information, as part of a manifest of the representation of the multimedia content, indicative of a maximum view identifier and a minimum view identifier for the representation to the client device.

In another example, a method of receiving information for video data includes receiving information indicative of a maximum view identifier for a representation and a minimum view identifier for the representation, wherein the maximum view identifier comprises a view identifier for a first view of a scene, wherein the minimum view identifier comprises a view identifier for a second view of the scene, and wherein the representation comprises video data for two or more views including the first view and the second view, determining a maximum horizontal location of a camera perspective for the two or more views of the representation and a minimum horizontal location of a camera perspective for the two or more views of the representation based on the maximum view identifier and the minimum view identifier, wherein view identifiers for the two or more views are assigned such that the view identifiers correspond to the relative horizontal locations of the camera perspectives for the two or more views, and requesting at least a portion of the video data of the representation based at least in part on the determined maximum and minimum horizontal locations of the camera perspectives for the two or more views of the representation.

In another example, an apparatus for receiving information for video data includes a processor configured to receive information indicative of a maximum view identifier for a representation and a minimum view identifier for the representation, wherein the maximum view identifier comprises a view identifier for a first view of a scene, wherein the minimum view identifier comprises a view identifier for a second view of the scene, and wherein the representation comprises video data for two or more views including the first view and the second view, determine a maximum horizontal location of a camera perspective for the two or more views of the representation and a minimum horizontal location of a camera perspective for the two or more views of the representation based on the maximum view identifier and the minimum view identifier, wherein view identifiers for the two or more views are assigned such that the view identifiers correspond to the relative horizontal locations of the camera perspectives for the two or more views, and request at least a portion of the video data of the representation based at least in part on the determined maximum and minimum horizontal locations of the camera perspectives for the two or more views of the representation.

In another example, an apparatus for receiving information for video data includes means for receiving information indicative of a maximum view identifier for a representation and a minimum view identifier for the representation, wherein the maximum view identifier comprises a view identifier for a first view of a scene, wherein the minimum view identifier comprises a view identifier for a second view of the scene, and wherein the representation comprises video data for two or more views including the first view and the second view, means for determining a maximum horizontal location of a camera perspective for the two or more views of the representation and a minimum horizontal location of a camera perspective for the two or more views of the representation based on the maximum view identifier and the minimum view identifier, wherein view identifiers for the two or more views are assigned such that the view identifiers correspond to the relative horizontal locations of the camera perspectives for the two or more views, and means for requesting at least a portion of the video data of the representation based at least in part on the determined maximum and minimum horizontal locations of the camera perspectives for the two or more views of the representation.

In another example, a computer program product includes a computer-readable storage medium comprises instructions that cause a processor of a destination device for receiving information for video data to receive information indicative of a maximum view identifier for a representation and a minimum view identifier for the representation, wherein the maximum view identifier comprises a view identifier for a first view of a scene, wherein the minimum view identifier comprises a view identifier for a second view of the scene, and wherein the representation comprises video data for two or more views including the first view and the second view, determine a maximum horizontal location of a camera perspective for the two or more views of the representation and a minimum horizontal location of a camera perspective for the two or more views of the representation based on the maximum view identifier and the minimum view identifier, wherein view identifiers for the two or more views are assigned such that the view identifiers correspond to the relative horizontal locations of the camera perspectives for the two or more views, and request at least a portion of the video data of the representation based at least in part on the determined maximum and minimum horizontal locations of the camera perspectives for the two or more views of the representation.

In another example, a method of signaling information for video data includes receiving, for multimedia content, video data for two or more views of a scene, forming a representation of the multimedia content, the representation comprising a subset of the two or more views, and sending, to a client device, information, as part of a manifest of the representation of the multimedia content, indicative of a maximum number of views in the representation that can be targeted for output.

In another example, an apparatus for signaling information for video data includes a processor configured to receive, for multimedia content, video data for two or more views of a scene, form a representation of the multimedia content, the representation comprising a subset of the two or more views, and send, to a client device, information, as part of a manifest of the representation of the multimedia content, indicative of a maximum number of views in the representation that can be targeted for output.

In another example, an apparatus for signaling information for video data includes means for receiving, for multimedia content, video data for two or more views of a scene, means for forming a representation of the multimedia content, the representation comprising a subset of the two or more views, and means for sending, to a client device, information, as part of a manifest of the representation of the multimedia content, indicative of a maximum number of views in the representation that can be targeted for output.

In another example, a computer program product includes a computer-readable storage medium having stored thereon instructions that, when executed, cause a processor of a device for signaling information for video data to receive, for multimedia content, video data for two or more views of a scene, form a representation comprising a subset of the two or more views, and send, to a client device, as part of a manifest of the representation of the multimedia content, information indicative of a maximum number of views in the representation that can be targeted for output.

In another example, a method of receiving information for video data includes receiving information indicative of a maximum number of views in a representation that can be targeted for output, wherein the representation comprises video data for one or more views of a scene, determining a maximum number of views that can be output by a destination device, and requesting at least a portion of the video data of the representation based at least in part on the determined maximum number of views that can be output by the destination device and the information indicative of the maximum number of views in the representation that can be targeted for output.

In another example, a destination apparatus for receiving information for video data includes a processor configured to receive information indicative of a maximum number of views in a representation that can be targeted for output, wherein the representation comprises video data for one or more views of a scene, determine a maximum number of views that can be output by the destination apparatus, and request at least a portion of the video data of the representation based at least in part on the determined maximum number of views that can be output by the destination apparatus and the information indicative of the maximum number of views in the representation that can be targeted for output.

In another example, a destination apparatus for receiving information for video data includes means for receiving information indicative of a maximum number of views in a representation that can be targeted for output, wherein the representation comprises video data for one or more views of a scene, means for determining a maximum number of views that can be output by a destination apparatus, and means for requesting at least a portion of the video data of the representation based at least in part on the determined maximum number of views that can be output by the destination apparatus and the information indicative of the maximum number of views in the representation that can be targeted for output.

In another example, a computer program product includes a computer-readable medium having stored thereon instructions that, when executed, cause a processor of a destination device for receiving information for video data to receive information indicative of a maximum number of views in a representation that can be targeted for output, wherein the representation comprises video data for one or more views of a scene, determine a maximum number of views that can be output by a destination device, and request at least a portion of the video data of the representation based at least in part on the determined maximum number of views that can be output by the destination device and the information indicative of the maximum number of views in the representation that can be targeted for output.

In this manner, the techniques of this disclosure may be used to determine a relative amount of three-dimensional depth provided for each of the representations. In general, a three-dimensional video representation with a larger view identifier range (that is, difference between the maximum and minimum view identifiers) may typically produce more aggressive three-dimensional video perception than representations having a smaller range, if all of the representations are bitstream subsets of the same MVC bitstream. The signaled information may further include information indicative of relative geometry of the views (e.g., whether increasing view identifiers indicate horizontally increasing locations of camera perspectives for the views), and/or a maximum number of views targeted for output for the representation.

The details of one or more examples are set forth in the accompanying drawings and the description below. Other features, objects, and advantages will be apparent from the description and drawings, and from the claims.

DETAILED DESCRIPTION

Figure 1:
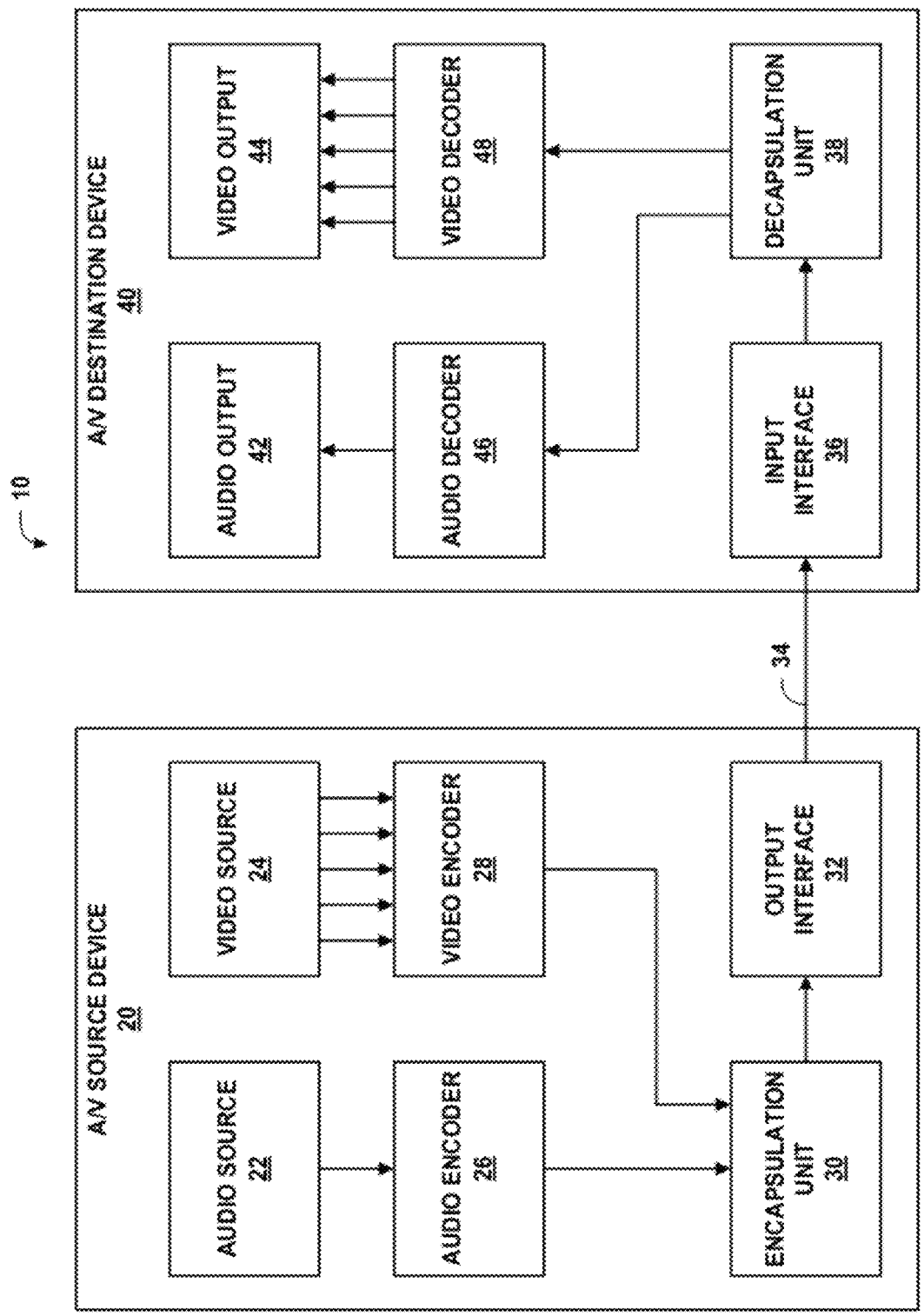
FIG. 1 is a block diagram illustrating an example system in which an audio/video (A/V) source device transfers audio and video data to an A/V destination device.

In general, this disclosure describes techniques for storage and transport of video data. More particularly, this disclosure provides techniques for signaling attributes for coded video data conforming to multiview video coding (MVC), and for streaming the coded video data over a network, e.g., according to hypertext transport protocol (HTTP) streaming. In some examples, streaming network data may conform to Dynamic Adaptive Streaming over HTTP (DASH). The attributes may describe a maximum number of views in a representation that can be targeted for output, and in some examples.

In accordance with the techniques of this disclosure, view identifiers for views of multimedia content may correspond to horizontal locations of camera perspectives for the views of coded video data. For example, view identifiers (view_ids) may be assigned according to the horizontal locations of the camera perspectives. In some examples, horizontal locations of the camera perspectives may be determined according to a function (e.g., monotonically increasing or decreasing function) of the view identifiers. In this manner, the camera perspective for a first view can be determined to be horizontally to the left or horizontally to the right of the camera perspective of a separate view based on the view identifiers for the first and second views. Moreover, the horizontal locations of the camera perspectives for each of the views could be arranged in order (e.g., by a destination device) based on the view identifiers for the views.

In some examples, the attributes may include a minimum and/or a maximum view identifier for all views of a representation. In this manner, the attributes may signal a range of view identifiers for a representation of the multimedia content. Because the view identifiers may correspond to horizontal locations of camera perspectives for the views, a destination device may determine a relative amount of depth for each representation. The attributes may further provide an indication of how the view identifiers are assigned, e.g., whether a larger view identifier corresponds to a view having a horizontal location of a camera perspective that is to the left or to the right of a horizontal location of a camera perspective for a view with a smaller camera perspective. In general, a higher range between the maximum and minimum view identifiers may correspond to a greater range of depth for three-dimensional video data of the representation. In some examples, the attributes may include a maximum number of target output views for the representation. The maximum number of target output views may be presented as operation points, in some examples. If the maximum number of target output views is equal to one, then only one view identifier could be signaled for the view identifier range.

The destination device may be configured to select a representation based on the relative amount of depth for the representation. For example, if the destination device is coupled to a relatively large display (e.g., a three-dimensional capable television), the destination device may select a representation having a larger range of depth, whereas if the destination device is coupled to a relatively small display (e.g., a mobile device such as a cellular telephone, a tablet computer, or a laptop computer), the destination device may select a representation having a smaller range of depth. Destination devices may also vary in terms of the number of views that can be displayed, and therefore, the destination device may select a representation based on a number of views targeted for output for the representation, using the number of views targeted for output as signaled in the attributes.

Using the information describing the representations, e.g., in the MPD data structure, a client device may select one of the representations to retrieve. For example, a source device may provide a variety of different representations to accommodate client devices of varying decoding and rendering capabilities. The same raw input video data may be encoded in a variety of different ways, e.g., with differing numbers of views, different selected views, different bitrates, different frame rates, different resolutions, different encoding standards, or other differences between representations. The source device may then describe the attributes of each representation in a data structure, such as a media presentation descriptor (MPD), that can be retrieved by client devices. The client devices may then retrieve the MPD to select a representation.

For example, the client device may be configured to select a representation (or operation point thereof) based on a desired amount of depth (e.g., corresponding to the difference between the maximum view identifier and the minimum view identifier, when the view identifiers are assigned such that they represent relative locations of camera perspectives for the views). As another example, the client device may be configured to select a representation (or operation point thereof) based on a maximum number of views that may be targeted for output, as well as a maximum number of views that can be displayed by the client device. In this manner, the client may attempt to fully utilize its display capabilities, while also attempting to minimize or eliminate any decoding of more video data than can be used (that is, displayed).

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In some examples, multiple views may be encoded as separate representations for multimedia content. Each representation may be encoded as a respective bitstream. In order to render three-dimensional video in such examples, a client device may retrieve two or more representations of the multimedia content. In such examples, a source device may assign virtual view identifiers to the representations, such that the virtual view identifiers correspond to relative locations of camera perspectives for the views of the representations. Thus, the techniques of this disclosure may apply even where three-dimensional video is supported by coding single view bitstreams in accordance with MPEG-2 (Motion Picture Experts Group), MPEG-4, ITU-T H.264/AVC, High Efficiency Video Coding (HEVC), or other video coding standards.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, which defines a general structure for time-based media files. It is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

When media is delivered over a streaming protocol, the media may need to be transformed from the way it is represented in the file. One example of this is when media is transmitted over the Real-time Transport Protocol (RTP). In the file, for example, each frame of video is stored contiguously as a file-format sample. In RTP, packetization rules specific to the codec used must be obeyed to place these frames in RTP packets. A streaming server may be configured to calculate such packetization at run-time. However, there is support for the assistance of the streaming servers.

The techniques of this disclosure may be applicable to network streaming protocols, such as HTTP streaming, e.g., in accordance with dynamic adaptive streaming over HTTP (DASH). The MPEG standard, for example, supports HTTP streaming based on 3GPP HTTP Streaming. In HTTP streaming, frequently used operations include GET and partial GET. The GET operation retrieves a whole file associated a given uniform resource locator (URL) or uniform resource name (URN). The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Each representation may also include one or more media components, where each media component may correspond to an encoded version of one individual media type, such as audio, vide, or timed text (e.g., for closed captioning). Media components may be time-continuous across boundaries of consecutive media segments within one representation.

In some examples, one or more attributes of a representation may be provided in a manifest for the representation. The manifest (or manifest file) may be sent from a server device to a destination device before sending video data comprising coded video samples from the server device to the destination device. The destination device may use the manifest to select a representation and to retrieve coded samples from the representation. For example, the manifest may include information indicative of a maximum view identifier for a representation, a minimum view identifier for the representation, an indication of a relationship between view identifiers and horizontal locations of camera perspectives for views, and/or an indication of a maximum number of views targeted for output in the representation. An MPD, as used in this disclosure, is one example of a manifest, e.g., in the context of HTTP Streaming.

As several examples, the manifest may correspond to a Flash Media Manifest File (FMF) extensible markup language (XML) formatted file, an M3U playlist file, a server manifest file such as a synchronized multimedia integration language (SMIL) document, and a client manifest file, although in other examples, similar data structures may be used. Although the techniques of this disclosure are generally described with respect to the use of an MPD to signal attributes of a representation (or multiple representations for multimedia content) for purposes of example, the techniques may generally apply to other examples of manifests, e.g., equivalent or similar data structures or elements.

FIG. 1 is a block diagram illustrating an example system 10 in which audio/video (A/V) source device 20 transports audio and video data to A/V destination device 40. System 10 of FIG. 1 may correspond to a video teleconference system, a server/client system, a broadcaster/receiver system, or any other system in which video data is sent from a source device, such as A/V source device 20, to a destination device, such as A/V destination device 40. In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder, also referred to as a vocoder.

A/V source device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Video source 24 may provide multiple simultaneous views of a scene. For example, video source 24 may correspond to a camera array, e.g., two or more cameras each separated by some amount of distance, such that each of the cameras in the array are directed to an approximately common focal point. In this manner, each of the cameras may provide a slightly different perspective of the scene. Encapsulation unit 30 may receive information indicative of relative locations of the cameras in the array and assign view identifiers to the views captured by the cameras, such that the view identifiers correspond to locations of the cameras and the camera perspectives. For example, encapsulation unit 30 may assign the view identifiers according to a monotonically increasing function or a monotonically decreasing function of the locations of the camera perspectives.

Video source 24 may also provide multiple simultaneous views using other techniques. For example, video source 24 may provide one view and depth information for objects in a scene. The depth information may be used to generate a second view from a second, virtual camera perspective. Video source 24 may include a processor to generate the second view, or a preprocessing unit for video encoder 28 may generate the second view. In some examples, video source 24 may comprise a computer that generates computer graphics using two or more camera perspectives.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. AN source device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

The techniques of this disclosure are generally directed to the storage and transport of encoded multimedia (e.g., audio and video) data, and reception and subsequent interpretation and decoding of the transported multimedia data. As shown in the example of FIG. 1, video source 24 may provide a plurality of views of a scene to video encoder 28. As discussed above, video source 24 may also provide information indicative of locations of camera perspectives for the views. Video source 24 may provide this information to video encoder 28, or may provide the information directly to encapsulation unit 30.

Encapsulation unit 30 may use the information indicative of relative locations of camera perspectives for the views to assign view identifiers to views of multimedia content. Encapsulation unit 30 may form one or more representations of the multimedia content, where each of the representations may include one or more views. In some examples, video encoder 28 may encode each view in different ways, e.g., with different frame rates, different bit rates, different resolutions, or other such differences. Thus, encapsulation unit 30 may form various representations having various characteristics, e.g., bit rate, frame rate, resolution, and the like. Each of the representations may correspond to respective bitstreams that can be retrieved by destination device 40. Encapsulation unit 30 may provide an indication of a range of view identifiers (view_ids) for views included in each representation, e.g., within a media presentation description (MPD) data structure for the multimedia content. For example, encapsulation unit 30 may provide an indication of a maximum view identifier and a minimum view identifier for the views of a representation. The MPD may further provide indications of maximum numbers of views targeted for output for each of a plurality of representations of the multimedia content. The MPD or data thereof may, in some examples, be stored in a manifest for the representation(s).

In accordance with the techniques of this disclosure, the view identifiers as assigned to the views may generally correspond to horizontal locations of camera perspectives for the views. For example, encapsulation unit 30 may assign the view identifiers to the views according to a monotonically increasing function of the horizontal locations of the camera perspectives for the views. In this manner, when the horizontal camera location in real-world coordinates for a first view is to the left of the horizontal camera location in real-world coordinates for a second view, the value of the view identifier for the first view may be less than the value of the view identifier for the second view. The monotonically increasing function may be a strictly monotonically increasing function.

As another example, encapsulation unit 30 may assign the view identifiers to the views according to a monotonically decreasing function of the horizontal locations of the camera perspectives for the views. In this manner, when the horizontal camera location in real-world coordinates for a first view is to the left of the horizontal camera location in real-world coordinates for a second view, the value of the view identifier for the first view may be greater than the value of the view identifier for the second view. The monotonically decreasing function may be a strictly monotonically decreasing function.

Each individual stream of data (whether audio or video) is referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, each view of MVC video data corresponds to respective elementary streams. Similarly, audio data corresponds to one or more respective elementary streams.

An MVC coded video sequence may be separated into several sub-bitstreams each corresponding to an elementary stream of video data. An MVC coded video sequence may also be separated into sub-bitstreams including more than one elementary stream of video data (for example, more than one view). Each sub-bitstream may be identified using an MVC view_id subset. Based on the concept of each MVC view_id subset, an MVC video sub-bitstream is defined. That is, there may be information indicating the view_ids of views included in the sub-bitstream. An MVC video sub-bitstream contains the NAL units of the views listed in the MVC view_id subset. A program stream generally contains only the NAL units which are from those of the elementary streams. It is also designed that any two elementary streams cannot contain an identical view, but may instead contain separate views, e.g., different perspectives of a scene for creating a three-dimensional effect.

It is possible to extract one or more views from an MVC bitstream to produce a sub-bitstream. A sub-bitstream with a given reasonable set of target output views is referred to as an operation point. Because of view dependencies, the set of target output views can be a subset of the views contained in a sub-bitstream. The target output views can also be identical to the views contained in the sub-bitstream. However, if a service provider does not intend to support an operation point with a large number of views, the number of target output views can be a subset of the contained views. Note that the contained views are the views to be decoded.

Encapsulation unit 30 may further provide an indication of a maximum number of views that can be targeted for output for each of the representations. In one example, encapsulation unit 30 may form operation points for a representation, where each operation point corresponds to a subset of the views of the representation. In some examples, the maximum number of views that can be targeted for output may correspond to the operation point having the largest number of views for the representation. Encapsulation unit 30 may also provide information indicative of a maximum and a minimum view identifier of all operation points contained in a representation. If the maximum number of target output views is 1, destination device 40 may determine that only one view identifier is signaled.

In the example of FIG. 1, encapsulation unit 30 receives elementary streams comprising video data from video encoder 28 and elementary streams comprising audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

A "representation," as used in this disclosure, may comprise a combination of audio data and video data, e.g., an audio elementary stream and a subset of available views delivered by a service of A/V source device 20. Each PES packet includes a stream_id that identifies the elementary stream to which the PES packet belongs. Encapsulation unit 30 is responsible for assembling elementary streams into a video file or other encapsulated data structure.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. To support MVC and SVC, it is possible to signal dependencies of representations so different views or layers of MVC or SVC can be put into different representations and requested together based on the dependencies during the HTTP streaming.

Encapsulation unit 30 may form NAL units comprising a header that identifies a program to which the NAL belongs, as well as a payload, e.g., audio data, video data, or data that describes the transport or program stream to which the NAL unit corresponds. For example, in H.264/AVC, a NAL unit includes a 1-byte header and a payload of varying size. In one example, a NAL unit header comprises a priority_id element, a temporal_id element, an anchor_pic_flag element, a view_id element, a non_idr_flag element, and an inter_view_flag element. In conventional MVC, the NAL unit defined by H.264 is retained, except for prefix NAL units and MVC coded slice NAL units, which include a 4-byte MVC NAL unit header and the NAL unit payload.

The priority_id element of a NAL header may be used for a simple one-path bitstream adaptation process. The temporal_id element may be used for specifying the temporal level of the corresponding NAL unit, where different temporal levels correspond to different frame rates.

The anchor_pic_flag element may indicate whether a picture is an anchor picture or non-anchor picture. Anchor pictures and all the pictures succeeding it in the output order (that is, the display order) can be correctly decoded without decoding of previous pictures in the decoding order (that is, the bitstream order), and thus, can be used as random access points. Anchor pictures and non-anchor pictures can have different dependencies, both of which are signaled in the sequence parameter set. Other flags are to be discussed and used in the following sections of this chapter. Such an anchor picture may also be referred to as an open GOP (Group Of Pictures) access point, while a close GOP access point is also supported when the non_idr_flag element is equal to zero. The non_idr_flag element indicates whether a picture is an instantaneous decoder refresh (IDR) or view IDR (V-IDR) picture. In general, an IDR picture, and all the pictures succeeding it in output order or bitstream order, can be correctly decoded without decoding of previous pictures in either decoding order or display order.

The view_id element may comprise syntax information that may be used to identify a view, which may be used for data interactivity inside an MVC decoder, e.g., for inter-view prediction, and outside a decoder, e.g., for rendering. The inter_view_flag element may specify whether the corresponding NAL unit is used by other views for inter-view prediction. To convey the 4-byte NAL unit header information for a base view, which may be compliant to AVC, a prefix NAL unit is defined in MVC. In the context of MVC, the base view access unit includes the VCL NAL units of the current time instance of the view as well as its prefix NAL unit, which contains only the NAL unit head. An H.264/AVC decoder may ignore the prefix NAL unit. In accordance with the techniques of this disclosure, the view_id element may provide an indication of relative horizontal camera perspective for a camera that captured the corresponding view.

Figure 5:
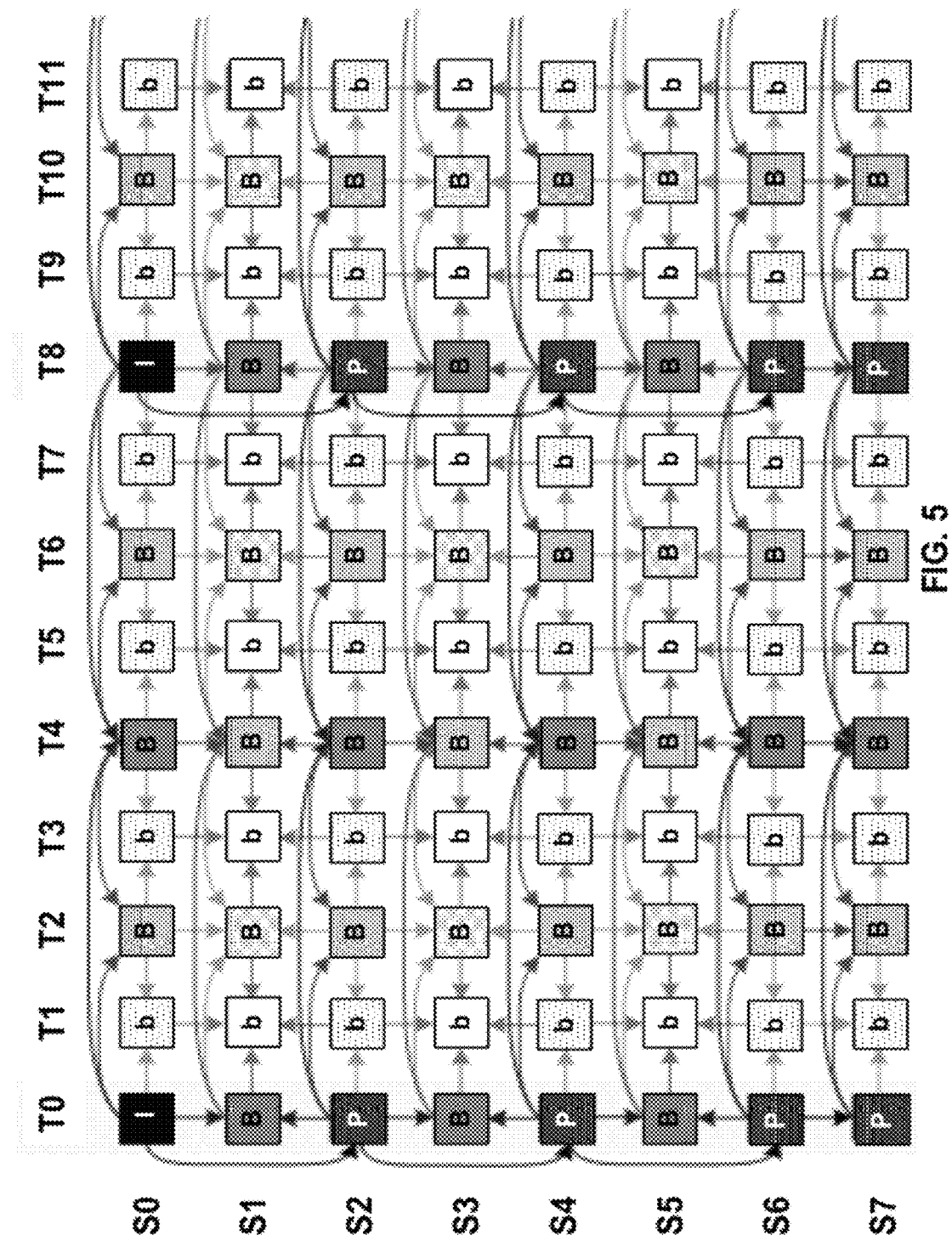
FIG. 5 is a conceptual diagram illustrating an example MVC prediction pattern.

Inter-view prediction is a technique for encoding MVC video data of a frame with reference to one or more frames at a common temporal location as the encoded frame of different views. FIG. 5, which is discussed in greater detail below, provides an example coding scheme for inter-view prediction. In general, an encoded frame of MVC video data may be predictively encoded spatially, temporally, and/or with reference to frames of other views at a common temporal location. Accordingly, reference views, from which other views are predicted, generally are decoded before the views for which the reference views act as reference, so that these decoded views can be used for reference when decoding referential views. The decoding order does not necessarily correspond to the order of the view_ids. Therefore, the decoding order of views is described using view order indexes. View order indexes are indexes that indicate the decoding order of corresponding view components in an access unit.

A NAL unit including video data in its payload may comprise various granularity levels of video data. For example, a NAL unit may comprise a block of video data, a macroblock, a plurality of macroblocks, a slice of video data, or an entire frame of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 second. During this time interval, the specific frames for all views of the same access unit (the same time instance) may be rendered simultaneously. In an example corresponding to H.264/AVC, an access unit may comprise a coded picture in one time instance, which may be presented as a primary coded picture. Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

As with most video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units are transmitted on a different channel than the other NAL units.

The examples of SVC and MVC provide sequence parameter set (SPS) extensions for scalable video or multiview video. The SPS extension information may be contained in sub-SPS NAL units, which may have a different NAL unit type than the other NAL units. Profile and level information for the supported operation points may be included in NAL units including SPS extension information.

A media presentation may include a media presentation description (MPD), which may contain descriptions of different alternative representations (e.g., video services with different qualities) and the description may include, e.g., codec information, a profile value, and a level value. A manifest for the media presentation may include data for the MPD. Destination device 40 may retrieve the MPD of a media presentation (e.g., may retrieve the manifest) to determine how to access movie fragments of various presentations. Movie fragments may be located in movie fragment boxes (moof boxes) of video files.

Video compression standards such as ITU-T H.261, H.262, H.263, MPEG-1, MPEG-2 and H.264/MPEG-4 part 10 make use of motion compensated temporal prediction to reduce temporal redundancy. The encoder uses a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures use only the reference picture before the current picture in temporal order. In a B-picture, each block of the B-picture may be predicted from one or two reference pictures. These reference pictures could be located before or after the current picture in temporal order.

In accordance with the H.264 coding standard, as an example, B-pictures use two lists of previously-coded reference pictures, list 0 and list 1. These two lists can each contain past and/or future coded pictures in temporal order. Blocks in a B-picture may be predicted in one of several ways: motion-compensated prediction from a list 0 reference picture, motion-compensated prediction from a list 1 reference picture, or motion-compensated prediction from the combination of both list 0 and list 1 reference pictures. To get the combination of both list 0 and list 1 reference pictures, two motion compensated reference areas are obtained from list 0 and list 1 reference picture respectively. Their combination may be used to predict the current block.

The ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Blocks may have different numbers of pixels in the horizontal and vertical dimensions. That is, blocks may include N×M pixels, where N is not necessarily equal to M.

Block sizes that are less than 16 by 16 may be referred to as partitions of a 16 by 16 macroblock. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, macroblocks and the various partitions, sometimes referred to as sub-blocks, may be considered video blocks. In addition, a slice may be considered to be a plurality of video blocks, such as macroblocks and/or sub-blocks. Each slice may be an independently decodable unit of a video frame. Alternatively, frames themselves may be decodable units, or other portions of a frame may be defined as decodable units. The term "coded unit" or "coding unit" may refer to any independently decodable unit of a video frame such as an entire frame, a slice of a frame, a group of pictures (GOP) also referred to as a sequence, or another independently decodable unit defined according to applicable coding techniques.

The term macroblock refers to a data structure for encoding picture and/or video data according to a two-dimensional pixel array that comprises 16×16 pixels. Each pixel comprises a chrominance component and a luminance component. Accordingly, the macroblock may define four luminance blocks, each comprising a two-dimensional array of 8×8 pixels, two chrominance blocks, each comprising a two-dimensional array of 16×16 pixels, and a header comprising syntax information, such as a coded block pattern (CBP), an encoding mode (e.g., intra-(I), or inter-(P or B) encoding modes), a partition size for partitions of an intra-encoded block (e.g., 16×16, 16×8, 8×16, 8×8, 8×4, 4×8, or 4×4), or one or more motion vectors for an inter-encoded macroblock.

Video encoder 28, video decoder 48, audio encoder 26, audio decoder 46, encapsulation unit 30, and decapsulation unit 38 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, and/or decapsulation unit 38 may comprise an integrated circuit, a microprocessor, and/or a wireless communication device, such as a cellular telephone.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to destination device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium 34, such as, for example, a transmission signal, a magnetic medium, an optical medium, a memory, a flash drive, or other computer-readable medium.

In some examples, output interface 32 may implement one or more network streaming protocols, such as HTTP Streaming Output interface 32, or another unit of source device 20, may await an HTTP Streaming request, e.g., a HEAD request, from destination device 40. In response to the head request, output interface 32 may provide the MPD for requested multimedia content. Destination device 40 may determine a representation to request based on data contained in the MPD, which may include the maximum number of target output views for each representation and a range of view identifiers for the views in the representation, where the view identifiers may be assigned such that they describe relative horizontal locations of camera perspectives for views of the representations. The MPD may also provide an indication of how the view identifiers are assigned, e.g., whether a larger view identifier corresponds to a view having a horizontal location of a camera perspective that is to the left or to the right of a horizontal location of a camera perspective for a view with a smaller camera perspective.

Ultimately, input interface 36 of destination device 40 retrieves the data from computer-readable medium 34. Input interface 36 may comprise, for example, an optical drive, a magnetic media drive, a USB port, a receiver, a transceiver, or other computer-readable medium interface. Input interface 36 may provide the NAL unit or access unit to decapsulation unit 38. Decapsulation unit 38 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In some examples, each of the representations may correspond to single view bitstreams, and virtual view identifiers may be assigned to the representations. The virtual view identifiers may indicate relative horizontal locations for camera perspectives of the representations. In some examples, the information may indicate whether two representations can form a stereo view pair.

In this manner, source device 20 represents an example of an apparatus for signaling information for video data, the apparatus comprising a processor configured to receive, for multimedia content, video data for two or more views of a scene, determine horizontal locations of camera perspectives for each of the two or more views, assign view identifiers to the two or more views such that the view identifiers correspond to the relative horizontal locations of the camera perspectives, form a representation of the multimedia content, the representation comprising a subset of the two or more views, and send information, as a part of a manifest for the representation of the multimedia content, indicative of a maximum view identifier and a minimum view identifier for the representation to the client device.

Likewise, destination device 40 represents an example of an apparatus for receiving information for video data, the apparatus comprising a processor configured to receive information indicative of a maximum view identifier for a representation and a minimum view identifier for the representation, wherein the maximum view identifier comprises a view identifier for a first view of a scene, wherein the minimum view identifier comprises a view identifier for a second view of the scene, and wherein the representation comprises video data for two or more views including the first view and the second view, determine a maximum horizontal location of a camera perspective for the two or more views of the representation and a minimum horizontal location of a camera perspective for the two or more views of the representation based on the maximum view identifier and the minimum view identifier, wherein view identifiers for the two or more views are assigned such that the view identifiers correspond to the relative horizontal locations of the camera perspectives for the two or more views, and request at least a portion of the video data of the representation based at least in part on the determined maximum and minimum horizontal locations of the camera perspectives for the two or more views of the representation.

Source device 20 also represents an example of an apparatus for signaling information for video data that includes a processor configured to receive, for multimedia content, video data for two or more views of a scene, form a representation of the multimedia content, the representation comprising a subset of the two or more views, and send, to a client device, as a part of a manifest for the representation of the multimedia content, information indicative of a maximum number of views in the representation that can be targeted for output.

Moreover, destination device 40 represent an example of a destination apparatus for receiving information for video data includes a processor configured to receive information indicative of a maximum number of views in a representation that can be targeted for output, wherein the representation comprises video data for one or more views of a scene, determine a maximum number of views that can be output by the destination apparatus, and request at least a portion of the video data of the representation based at least in part on the determined maximum number of views that can be output by the destination apparatus and the information indicative of the maximum number of views in the representation that can be targeted for output.

Figure 2:
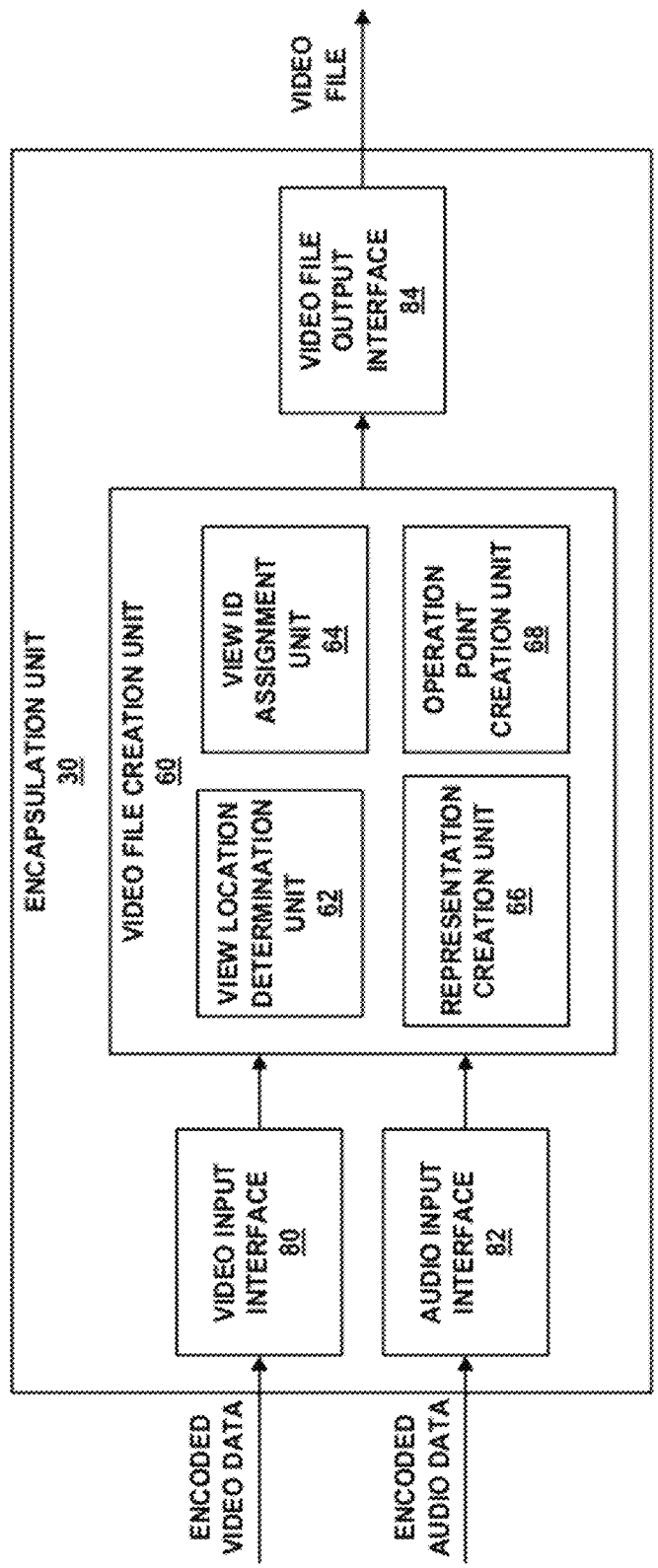
FIG. 2 is a block diagram illustrating components of an example encapsulation unit.

FIG. 2 is a block diagram illustrating components of an example encapsulation unit 30. In the example of FIG. 2, encapsulation unit 30 includes video input interface 80, audio input interface 82, video file creation unit 60, and video file output interface 84. Video file creation unit 60, in this example, includes view location determination unit 62, view identifier (ID) assignment unit 64, representation creation unit 66, and operation point creation unit 68.

Video input interface 80 and audio input interface 82 receive encoded video and audio data, respectively. Video input interface 80 and audio input interface 82 may receive encoded video and audio data as the data is encoded, or may retrieve encoded video and audio data from a computer-readable medium. Upon receiving encoded video and audio data, video input interface 80 and audio input interface 82 pass the encoded video and audio data to video file creation unit 60 for assembly into a video file.

Video file creation unit 60 may correspond to a control unit including hardware, software, and/or firmware configured to perform the functions and procedures attributed thereto. The control unit may further perform the functions attributed to encapsulation unit 30 generally. For examples in which video file creation unit 60 is embodied in software and/or firmware, encapsulation unit 30 may include a computer-readable medium comprising instructions for video file creation unit 60 and a processing unit to execute the instructions. Each of the sub-units of video file creation unit 60 (view location determination unit 62, view ID assignment unit 64, representation creation unit 66, and operation point creation unit 68, in this example) may be implemented as individual hardware units and/or software modules, and may be functionally integrated or further separated into additional sub-units.

Video file creation unit 60 may correspond to any suitable processing unit or processing circuitry, such as, for example, one or more microprocessors, application-specific integrated circuits (ASICs), field programmable gate arrays (FPGAs), digital signal processors (DSPs), or any combination thereof. Video file creation unit 60 may further include a non-transitory computer-readable medium storing instructions for any or all of view location determination unit 62, view ID assignment unit 64, representation creation unit 66, and operation point creation unit 68, as well as a processor for executing the instructions.

In general, video file creation unit 60 may create one or more video files including the received audio and video data. In accordance with the techniques of this disclosure, video file creation unit 60 may assign view identifiers to views of multimedia content such that the view identifiers correspond to horizontal locations of camera perspectives for the views in the representations. In particular, the view identifiers correspond to the locations of cameras that captured the raw video data for the views. In this manner, the view identifiers may correspond to horizontal locations of camera perspectives for the corresponding views. Accordingly, the difference between view identifiers for a first view and a second view may indicate the location of the camera perspective of the second view relative to the location of the camera perspective of the first view.

Video input interface 80 may receive one or more encoded views for the multimedia content. View location determination unit 62 may receive information indicating locations of cameras that captured one or more views of multimedia content. In some examples, view location determination unit 62 may receive the information indicating the locations via video input interface 80. In some examples, view location determination unit 62 may receive side information including the information indicating the locations. For example, view location determination unit 62 may receive the information directly from video source 24. Some video standards, e.g., MVC, provide view_id values in the Sequence Parameter Set and NAL unit header. In such examples, the destination device may check the video source to generate the manifest information of the view locations, maximum number of views and view ranges for each representation.

View ID assignment unit 64 may assign view identifiers to views based on the locations of camera perspectives for the views as determined by view location determination unit 62. In one example, view ID assignment unit 64 may assign view identifiers to the views as a function of the locations of the camera perspectives for the views. The function may be strictly monotonically increasing or strictly monotonically decreasing. Thus, in some examples, as the locations of the camera perspectives for the views proceeds horizontally from left to right, the view identifiers for the views may increase according to a monotonically increasing function. In other examples, as the locations of the camera perspectives for the views proceeds horizontally from left to right, the view identifiers for the views may decrease according to a monotonically decreasing function.

Video file creation unit 60 may construct a media presentation description (MPD) for multimedia content including two or more views. In other examples, video file creation unit 60 may create a manifest storing data similar to that of the MPD for the multimedia content. View ID assignment unit 64 may assign view identifiers to each of the views of the multimedia content such that the view identifiers correspond to horizontal locations of camera perspectives for the views. Representation creation unit 66 may construct one or more representations for the multimedia content, each of which may include one or more of the views for the multimedia content. In some examples, view ID assignment unit 64 may include data in the MPD and/or the representations (e.g., header data for the representations) indicating a maximum and a minimum of the view identifiers for views included in the representations. In addition, representation creation unit 66 may provide information in the MPD that indicates whether larger view IDs correspond to views having camera perspectives to the right or to the left of camera perspectives for views having smaller view IDs.

In some examples, the same view may be encoded using various encoding characteristics, such as different frame rates, different bit rates, different encoding schemes, or other differences. Representation creation unit 66 may ensure that each view included in a common representation is encoded according to the same encoding characteristics. In this manner, the MPD and/or header data for the representation may signal a set of characteristics (or attributes) for the representation that applies to all views in the representation. Moreover, representation creation unit 66 may create multiple representations including the same views, albeit with potentially different encoding characteristics.

In some examples, representation creation unit 66 may encapsulate each view of multimedia content in individual representations. In such examples, to output more than one view, destination device 40 may request two or more representations of the multimedia content. View ID assignment unit 64 may, in accordance with the techniques of this disclosure, assign virtual view identifiers to the representations, such that the virtual view identifiers correspond to horizontal locations of camera perspectives for the views encapsulated by the representations. In this manner, to retrieve views having desired camera perspectives, destination device 40 may request representations identified by the virtual view identifiers corresponding to the desired camera perspectives.

As an example, destination device 40 may calculate the difference between view identifiers to determine a relative offset between horizontal locations of camera perspectives for the views. Thus, in some examples, destination device 40 may request two views having a greater difference between their view identifiers to increase the amount of relative depth displayed. Similarly, destination device 40 may request two views having a lesser difference between their view identifiers to decrease the amount of depth displayed. Destination device 40 may be configured with a default amount of depth to display, and in some examples may receive feedback from a user during playback indicative of the user's desire to increase or decrease the amount of depth shown.

For example, when destination device 40 includes or is coupled to a relatively large display, such as a user's television, the default amount of depth may be relatively large, whereas when destination device includes or is coupled to a relatively small display, such as a mobile device, the default amount of depth may be relatively small. During playback, a user may provide feedback to destination device 40 to increase or decrease the amount of depth being displayed. Destination device 40 may use the view identifiers signaled by view ID assignment unit 64 to select different views, e.g., from the same operation point, the same representation, or even from a different representation of the same multimedia content, to accommodate the user's request.

Operation point creation unit 68 may create operation points for one or more representations of the multimedia content. In general, an operation point corresponds to a subset of views in a representation that are targeted for output, where each of the views shares a common temporal level. As defined by the H.264/AVC specification:

An operation point is identified by a temporal_id value representing the target temporal level and a set of view_id values representing the target output views. One operation point is associated with a bitstream subset, which consists of the target output views and all other views the target output views depend on, that is derived using the sub-bitstream extraction process as specified in subclause H.8.5.3 with tIdTarget equal to the temporal_id value and viewIdTargetList consisting of the set of view_id values as inputs. More than one operation point may be associated with the same bitstream subset. When the specification states "an operation point is decoded" it refers to the decoding of a bitstream subset corresponding to the operation point and subsequent output of the target output views.

In accordance with the techniques of this disclosure, more than one of the representations created by representation creation unit 66 may correspond to an MVC representation.

In this manner, the techniques of this disclosure may support adaptation based on bitrate and other characteristics of a representation. For example, during playback, destination device 40 may determine that an amount of network bandwidth that was available at an earlier time of playback has changed, and therefore request data from a different MVC representation based on the new amount of bandwidth. Destination device 40 may have selected the previous MVC representation based on a number of target output views.

Operation point creation unit 68 may designate one or more operation points for each MVC representation of multimedia content. In addition, operation point creation unit 68 may signal a number of target output views for each operation point of an MVC representation, e.g., in a header of the representation or in the MPD. Alternatively, operation point creation unit 68 may signal the maximum number of target output views for the MVC representation as operation points of the representation. Rather than signaling just one value for the number of target output views for a representation, a device according to the techniques of this disclosure may signal target output views for each operation point of the representation.

Video file creation unit 60 may pass created video files to video file output interface 84. In some examples, a single video file may include one or more representations and signaling data for the representations, e.g., an MPD data structure. In other examples, the MPD data structure may be separated from representations described by the MPD in one or more files, and data for each of the representations may be stored in one or more files. Video file output interface 84 may pass the created video files to a computer-readable medium, such as a transmission medium or a storage medium.

Figure 3:
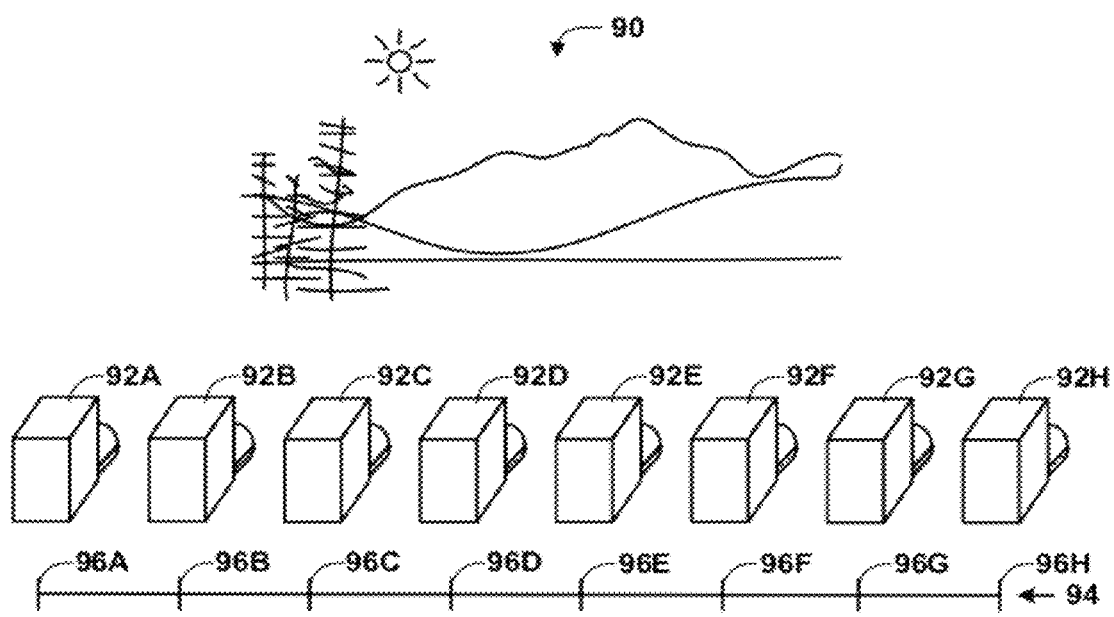
FIG. 3 is a conceptual diagram illustrating an array of cameras for capturing image data for views of a scene from various locations.

FIG. 3 is a conceptual diagram illustrating an array of cameras 92A-92H (cameras 92) capturing image data for views of scene 90 from various locations. In general, each of cameras 92 may capture images at substantially similar times. Cameras 92 may be aimed at a common focal point of scene 90. Cameras 92 are positioned along axis 94 at various horizontal locations 96A-96H (locations 96). Accordingly, views captured by cameras 92 have slightly different perspectives of scene 90.

In accordance with the techniques of this disclosure, source device 20 (FIG. 1) may assign view identifiers to views captured by cameras 92 based on locations 96 of cameras 92. In some examples, view identifiers assigned to views captured by cameras 92 may increase according to a monotonically increasing function of locations 96 of cameras 92. Thus, the view identifier assigned to the view captured by camera 92A may be the lowest-valued view identifier, the view identifier assigned to the view captured by camera 92H may be the highest-valued view identifier, and view identifiers assigned to the views captured by remaining cameras 92 may proceed according to locations 96 of cameras 92. For example, the view identifier assigned to the view captured by camera 92E may be greater than view identifiers for views captured by cameras 92A-92D, but less than view identifiers for views captured by cameras 92F-92H.

In some examples, view identifiers assigned to views captured by cameras 92 may decrease according to a monotonically decreasing function of locations 96 of cameras 92. Thus, the view identifier assigned to the view captured by camera 92A may be the highest-valued view identifier, the view identifier assigned to the view captured by camera 92H may be the lowest-valued view identifier, and view identifiers assigned to the views captured by remaining cameras 92 may proceed according to locations 96 of cameras 92. For example, the view identifier assigned to the view captured by camera 92E may be less than view identifiers for views captured by cameras 92A-92D, but greater than view identifiers for views captured by cameras 92F-92H.

In this manner, a difference between view identifiers for views captured by cameras 92 may approximately correspond to the difference in locations 96 for cameras 92. For example, the difference between the view identifier for the view captured by camera 92E and the view identifier for the view captured by camera 92A may approximately represent the distance between location 96E and location 96A. Thus, if the view identifiers are assigned according to a monotonically increasing function of locations 96, destination device 40 may determine that the location of the camera perspective for the view captured by camera 92E is horizontally to the right of the location of the camera perspective for the views captured by cameras 92A-92D when the view identifier for the view captured by camera 92E is greater than the view identifiers for the views captured by cameras 92A-92D.

Similarly, if the view identifiers are assigned according to a monotonically decreasing function of locations 96, destination device 40 may determine that the location of the camera perspective for the view captured by camera 92E is horizontally to the right of the location of the camera perspective for the views captured by cameras 92A-92D when the view identifier for the view captured by camera 92E is less than the view identifiers for the views captured by cameras 92A-92D.

Figure 4:
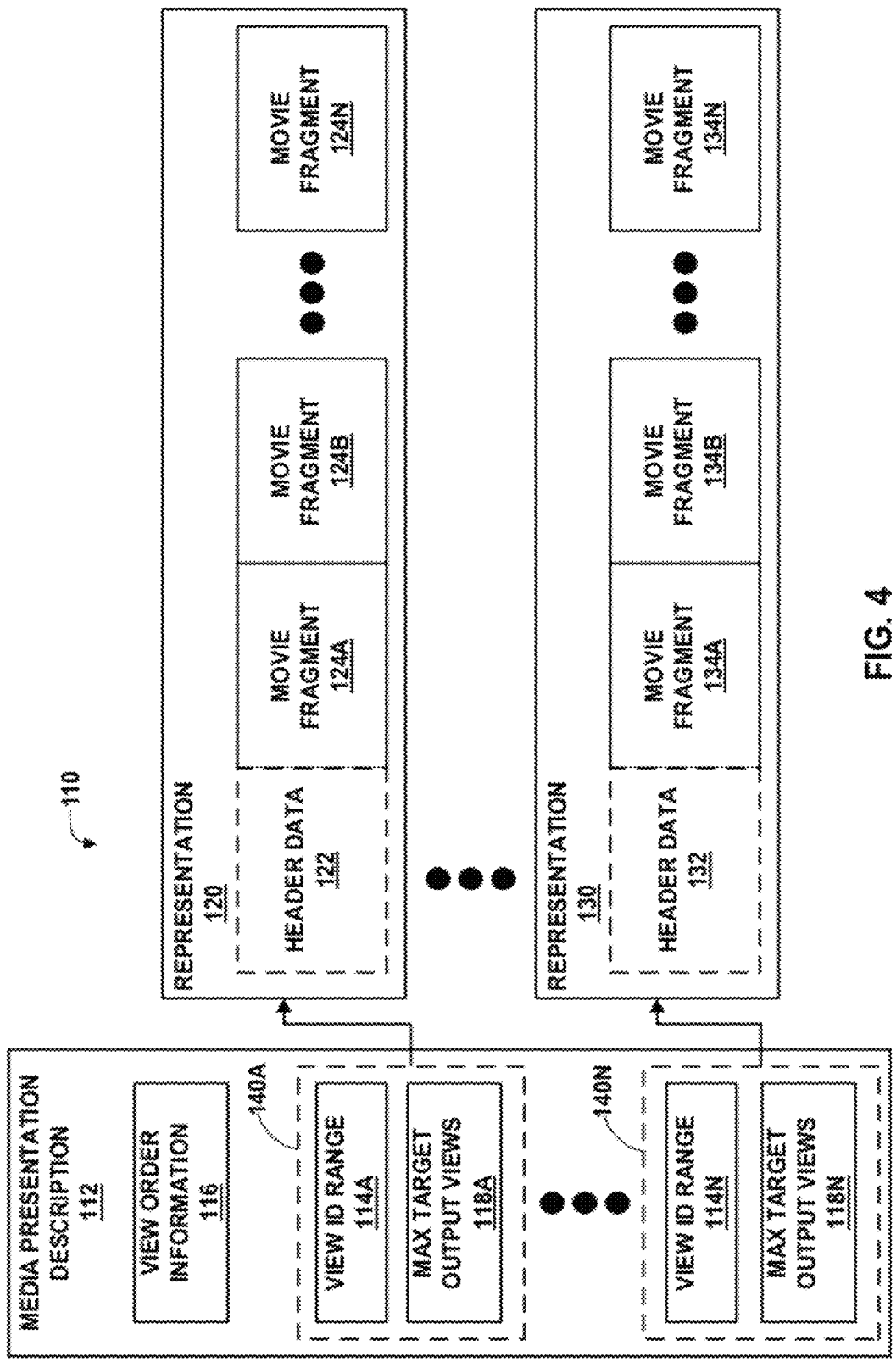
FIG. 4 is a conceptual diagram of a media presentation description (MPD) that provides attributes for various representations of multimedia content.

FIG. 4 is a conceptual diagram of a media presentation description (MPD) 112 that provides attributes for various representations 120, 130 of multimedia content 110. In this example, MPD 112 and representations 120-130 correspond to the same multimedia content, namely multimedia content 110 in this example. MPD 112 includes signaling data 140A that describes attributes of representation 120 and signaling data 140N that describes attributes of representation 130. Signaling data 140A includes view identifier (ID) range 114A, and max target output views value 118A. Signaling data 140N includes view ID range 114N, and max target output views value 118N. MPD 112 also includes view order information 116 that describes ordering of horizontal locations of camera perspectives for views of multimedia content 110. The description below focuses on signaling data 140A, but it should be understood that signaling data 140N conforms substantially to signaling data 140A, but with respect to representation 130 rather than representation 120, in this example. MPD 112 represents one example of a manifest of representations 120-130. In other examples, other manifests may store data similar to that of MPD 112.

View ID range 114A includes a maximum and a minimum of the view identifiers for views included in representation 120. Moreover, in accordance with the techniques of this disclosure, view identifiers for views of representation 120 may generally correspond to horizontal locations of camera perspectives for the corresponding views. Thus, the difference between the maximum and minimum view identifiers of view ID range 114A may approximately represent the relative amount of depth provided by the views included in representation 120.

View order information 116 may provide an indication of ordering of horizontal locations of camera perspectives for the views of multimedia content 110. For example, view order information 116 may provide an indication of whether increasing view identifiers for views of multimedia content 110 indicates that the horizontal locations of camera perspectives for the views shifts from left to right or right to left. In this manner, view order information 116 may provide an indication of how the view identifiers are assigned, e.g., whether a larger view identifier corresponds to a view having a horizontal location of a camera perspective that is to the left or to the right of a horizontal location of a camera perspective for a view with a smaller camera perspective. Because the view identifiers are assigned to views of multimedia content 110 generally, MPD 112 need only provide a single indication of how horizontal locations of camera perspectives for the views are ordered relative to view identifiers for the views. However, in some examples, view order information 116 may be provided in each set of signaling information 140.

Max target for output value 118A describes a maximum number of target output views for representation 120. In general, max target for output value 118A describes the largest number of views that can be targeted for output from any of the operation points of representation 120. In some examples, when only one view is included within a representation, max target for output value 118A may have a value of 1. In this case, view ID range 114A may include only one view identifier value.

Representation 120 includes header data 122 and movie fragments 124A-124N (movie fragments 124). Use of the letter 'N' in movie fragments 124N, 134N, and signaling data 140N should be understood as simply a variable, and is not intended to imply that there are an equal number of movie fragments 124 and movie fragments 134, or that there are an equal number of movie fragments 124 and sets of signaling data 140. On the contrary, there may be different numbers of movie fragments 124, movie fragments 134, and sets of signaling data 140.

Header data 122 is not always included in representations, and is therefore illustrated as being optional with a dashed outline. When present, header data 122 may include descriptive data for representation 120. For example, header data 122 may include sequence parameter set (SPS) data for movie fragments 124 and/or picture parameter sets (PPS) for data of movie fragments 124. Header data 132 may conform substantially to header data 122, with respect to representation 130.

Movie fragments 124 may each include one or more coded video samples, e.g., network abstraction layer (NAL) units. Each of movie fragments 124 may be independently retrievable and, in some examples, independently decodable, units of video data. In this manner, movie fragments 124 may be retrieved sequentially using, e.g., a network streaming protocol, such as HTTP streaming. For example, destination device 40 may submit an HTTP Get request directed to a URL associated with one of movie fragments 124. In some examples, destination device 40 may retrieve a portion of one of movie fragments 124 by sending an HTTP partial Get request to the URL, such that the request specifies a desired byte range of the movie fragment. Source device 20 may respond by sending the requested byte range to destination device 40.

In some examples, each of movie fragments 124 may include a random access point. In some examples, MPD 112 and/or header data 122 may signal which of movie fragments 124 includes a random access point and whether the random access point is an open decoder refresh (ODR) random access point or an instantaneous decoder refresh (IDR) random access point. Movie fragments 134 may conform substantially to movie fragments 124, in that movie fragments 134 may be independently retrievable units of data.

FIG. 5 is a conceptual diagram illustrating an example MVC prediction pattern. In the example of FIG. 5, eight views (having view IDs "S0" through "S7") are illustrated, and twelve temporal locations ("T0" through "T11") are illustrated for each view. That is, each row in FIG. 5 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views.

Frames in FIG. 5 are indicated at the intersection of each row and each column in FIG. 5 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the point-from object for prediction reference. For example, the P-frame of view S2 at temporal location T0 is predicted from the I-frame of view S0 at temporal location T0.

As with single view video encoding, frames of a multi-view video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

FIG. 5 provides various examples of inter-view prediction. Frames of view S1, in the example of FIG. 5, are illustrated as being predicted from frames at different temporal locations of view S1, as well as inter-view predicted from frames of frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 5, capital "B" and lowercase "b" are intended to indicate different hierarchical relationships between frames, rather than different encoding methodologies. In general, capital "B" frames are relatively higher in the prediction hierarchy than lowercase "b" frames. FIG. 5 also illustrates variations in the prediction hierarchy using different levels of shading, where a greater amount of shading (that is, relatively darker) frames are higher in the prediction hierarchy than those frames having less shading (that is, relatively lighter). For example, all I-frames in FIG. 5 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that frames relatively higher in the prediction hierarchy should be decoded before decoding frames that are relatively lower in the hierarchy, such that those frames relatively higher in the hierarchy can be used as reference frames during decoding of the frames relatively lower in the hierarchy. A view order index is an index that indicates the decoding order of view components in an access unit. The view order indices are implied in the SPS MVC extension, as specified in Annex H of H.264/AVC (the MVC amendment). In the SPS, for each index i, the corresponding view_id is signaled. The decoding of the view components shall follow the ascending order of the view order index. If all the views are presented, then the view order indexes are in a consecutive order from 0 to num_views_minus_1.

In this manner, frames used as reference frames may be decoded before decoding the frames that are encoded with reference to the reference frames. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain frames at equal levels of the hierarchy, decoding order may not matter relative to each other. For example, the I-frame of view S0 at temporal location T0 is used as a reference frame for the P-frame of view S2 at temporal location T0, which is in turn used as a reference frame for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 5. Also, with respect to the example of FIG. 5, S0>S1, S2>S1, S2>S3, S4>S3, S4>S5, and S6>S5. Any decoding order for the views that does not violate these requirements is possible. Accordingly, many different decoding orders are possible, with only certain limitations.

In accordance with the techniques of this disclosure, view identifiers for views S0-S7 may be assigned such that the view identifiers generally correspond to the locations of camera perspectives for the views. For example, with respect to the example of FIG. 3, camera 92A may have captured data for view S0, camera 92B may have captured data for view S1, and so on. Accordingly, view identifiers for views S0-S7 may increase according to a monotonically increasing function of locations 96, or may decrease according to a monotonically decreasing function of locations 96. In accordance with the techniques of this disclosure, the MPD may signal a maximum and minimum view identifier for each representation. Thus, if a representation includes each of views S0-S7, the MPD may signal the maximum view identifier as the view identifier for view S7, and the minimum view identifier as the view identifier for view S0.

An operation point, as noted, may generally correspond to a subset of available views. If each of views S0-S7 is included in a representation, an operation point may correspond to any subset of views S0-S7. Typically, an operation point includes a set of views targeted for output as well as intervening views needed for decoding. Thus, if views S0 and S1 are included in an operation point and are targeted for output, the operation point may also include view S2, such that view S1 can be properly decoded (relative to data of view S2). Thus, although an operation point may include a particular number of views, the number of target output views may differ from the number of views actually included for the operation point.

Figure 6:
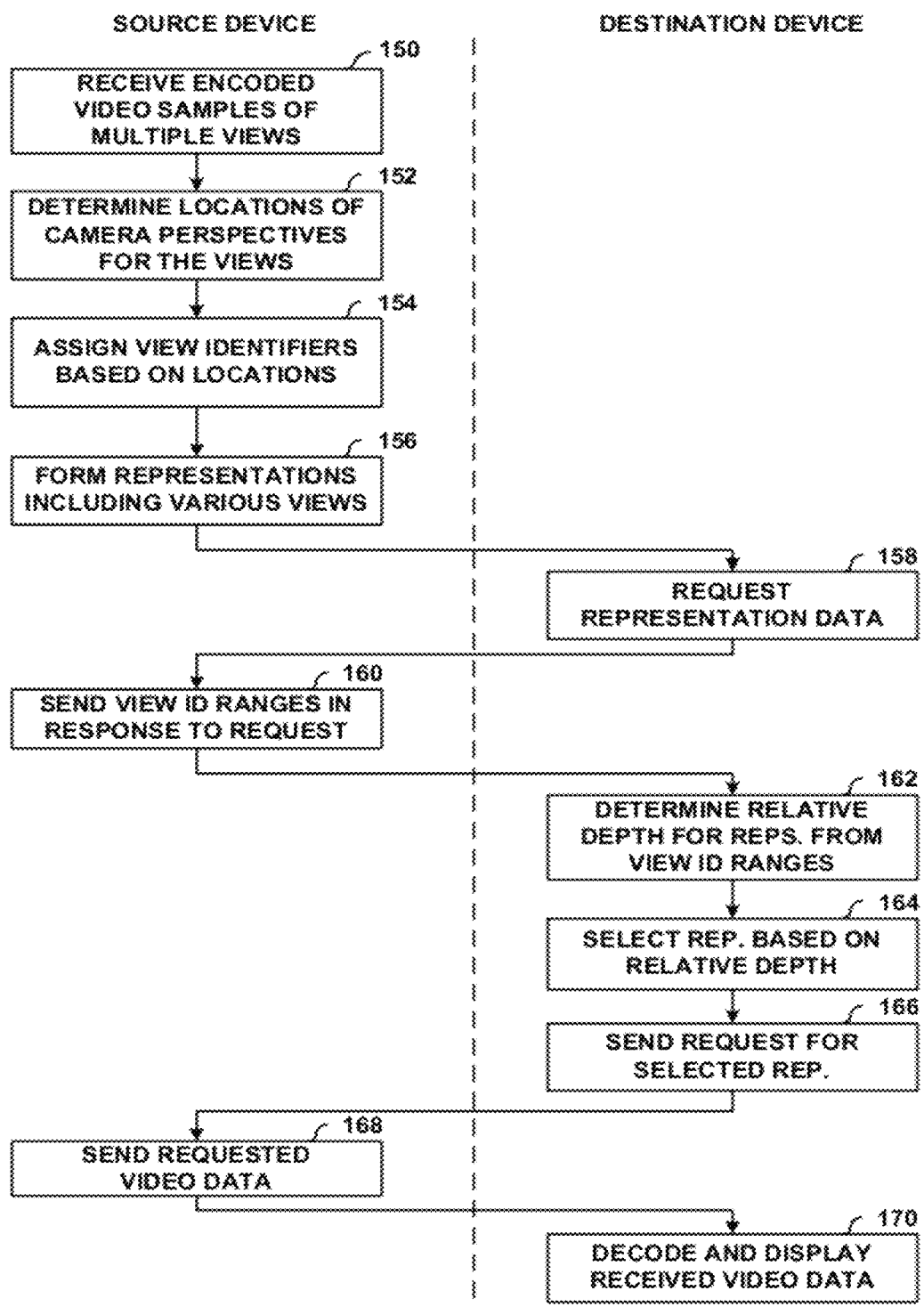
FIG. 6 is a flowchart illustrating an example method of signaling information for video data by a source device and receiving the information by a destination device.

FIG. 6 is a flowchart illustrating an example method of signaling information for video data by a source device and receiving the information by a destination device. Although described with respect to source device 20 and destination device 40 of FIG. 1, it should be understood that some or all of the elements of FIG. 6 may be performed by additional or alternative devices. For example, separate devices may assign view identifiers to views, form representations including various selections of the views, and/or provide information to destination devices in accordance with a network streaming protocol. Moreover, additional or alternative steps may be performed, and certain steps may be performed in a different order, without departing from the techniques of this disclosure.

In the example of FIG. 6, source device 20 may first receive encoded video samples from multiple views of a scene (150). For example, source device 20 may receive video data captured by a camera array targeting a common scene, such as the array of cameras 92 illustrated in FIG. 3. As another example, source device 20 may retrieve video data for two or more views of a scene from a computer-readable medium. As still another example, source device 20 may generate, or receive from another device that generated, video data for two or more views of a scene.

In any case, source device 20 may then determine locations of camera perspectives for each of the views (152). For example, source device 20 may receive this location information from cameras that captured the views, from a human operator, from a separate computing device, or other sources that determine the relative locations of the cameras that captured the video data for the views.

Source device 20 may then assign view identifiers to the views based on the locations of the cameras that captured the video data for the views (154). That is, source device 20 may assign view identifiers to the views such that the view identifiers correspond to the locations of the cameras that captured video data for the views. Source device 20 may assign the view identifiers to the views as a function, e.g., a monotonically increasing or monotonically decreasing function, of the horizontal locations of the cameras that captured the video data for the views. In this manner, for any two of the views, the difference between a first identifier for a first view captured by a first camera and a second identifier for a second view captured by a second camera indicates the location of the second camera perspective for the second view relative to the location of the first camera perspective for the first view.

Source device 20 may then form one or more representations including various sets of the views (156). Each of the representations may include one or more of the views. In some examples, a view may be encoded multiple times in a variety of different ways, so source device 20 may include various encoded versions of any or all of the views in different representations. Source device 20 may also generate a data structure that describes a view identifier range for views that are included in each of the representations, such as a media presentation descriptor (MPD) data structure, which may resemble MPD 112 (FIG. 4). For example, the MPD data structure may include an indication, of a maximum and a minimum of the view identifiers for each of the representations. The MPD may further provide an indication of a relative ordering of horizontal locations of camera perspectives for views of the multimedia content relative to the value of view identifiers for the views. In this manner, the MPD may provide an indication of how the view identifiers are assigned, e.g., whether a larger view identifier corresponds to a view having a horizontal location of a camera perspective that is to the left or to the right of a horizontal location of a camera perspective for a view with a smaller camera perspective. The MPD may also provide an indication of a number of views targeted for output for each of the representations.

Destination device 40 may request representation data that describes one or more of the representations (158). For example, destination device 40 may send an HTTP streaming HEAD request to a URL associated with multimedia content including the representations. In response to the request, source device 20 may send the view identifier ranges for views included in the representations to destination device 40 (160). Source device 20 may also send the information indicating the number of views targeted for output for each of the representations. For example, source device 20 may send header data (such as header data 122, 132 of FIG. 4) to destination device 40. As another example, source device 20 may send an MPD (such as MPD 112 of FIG. 4) to destination device 40. Although described primarily with respect to signaling view identifier ranges, it should be understood that in addition or in the alternative, source device 20 may signal a value for a maximum number of views that can be targeted for output for the representation, in other examples.

Using the data received from source device 20, which includes view identifier ranges for each of the representations (e.g., a maximum view identifier and a minimum view identifier for each of the representations), destination device 40 may determine relative depth for each of the representations from the view identifier ranges (162). Destination device 40 may then select a representation based on the relative depth information (164). In particular, destination device 40 may select one of the representations including an amount of depth that corresponds to a desired amount of depth to be displayed by a display device of destination device 40. Destination device 40 may then send a request for video data of the selected representation (166). For example, destination device 40 may send one or more HTTP Get or partial Get requests to source device 20, where the requests are constructed to retrieve data from the selected representation.

The selection of a representation made by destination device 40 may take other factors into account as well. For example, destination device 40 may select a representation based on decoding and/or rendering requirements of the representation, such that destination device 40 is able to properly decode and render the selected representation. Destination device 40 may also take account of a determined amount of available network bandwidth when selecting the representation. The MPD or header data may describe decoding and rendering requirements of the representations, as well as bitrates for the representations, in addition to the operation point information and view identifiers. Destination device 40 may therefore also use this additional information when selecting one of the representations to request from source device 20. If the amount of available network bandwidth changes during playback, destination device 40 may adaptively switch to a different representation, based on the newly determined amount of network bandwidth.

In any case, in response to a request for data from a representation, source device 20 may send the requested video data to destination device 40 (168). Destination device 40 may then decode and display the received video data (170). Destination device 40 may continue to request sequential data of the selected representation until destination device 40 has decoded and displayed all of the data for the representation, or until the end of playback. In some examples, playback may be terminated prematurely, e.g., when a user decides not to watch a remaining portion of a video.

In this manner, FIG. 6 represents an example of a method of signaling information for video data, including receiving, for multimedia content, video data for two or more views of a scene, determining horizontal locations of camera perspectives for each of the two or more views, assigning view identifiers to the two or more views such that the view identifiers correspond to the relative horizontal locations of the camera perspectives, forming a representation of the multimedia content, the representation comprising a subset of the two or more views, and, in response to a request from a client device, sending information, as part of a manifest of the representation of the multimedia content, indicative of a maximum view identifier and a minimum view identifier for the representation to the client device.

FIG. 6 also represents an example of a method of receiving information for video data, including receiving information indicative of a maximum view identifier for a representation and a minimum view identifier for the representation, wherein the maximum view identifier comprises a view identifier for a first view of a scene, wherein the minimum view identifier comprises a view identifier for a second view of the scene, and wherein the representation comprises video data for two or more views including the first view and the second view, determining a maximum horizontal location of a camera perspective for the two or more views of the representation and a minimum horizontal location of a camera perspective for the two or more views of the representation based on the maximum view identifier and the minimum view identifier, wherein view identifiers for the two or more views are assigned such that the view identifiers correspond to the relative horizontal locations of the camera perspectives for the two or more views, and requesting at least a portion of the video data of the representation based at least in part on the determined maximum and minimum horizontal locations of the camera perspectives for the two or more views of the representation.

Figure 7:
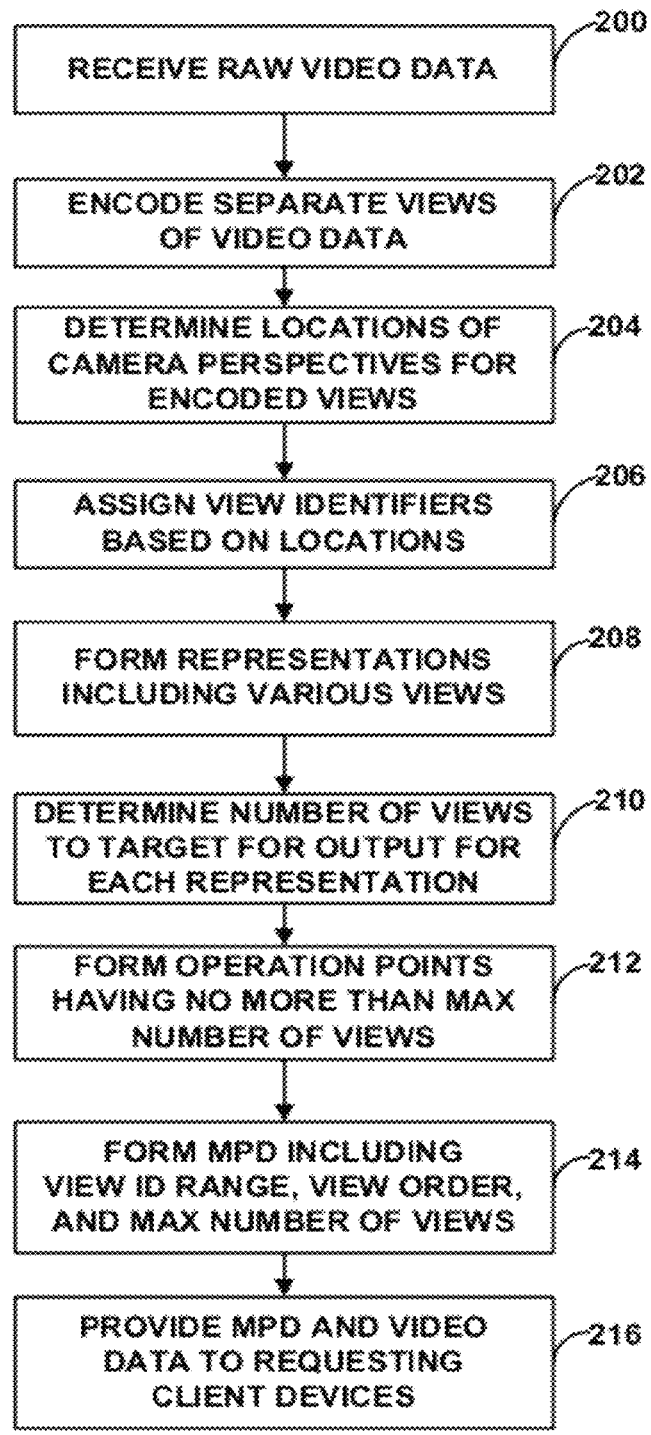
FIG. 7 is a flowchart illustrating an example method for assigning view identifiers to views of multimedia content and presenting a number of target output views of a representation as operation points.

FIG. 7 is a flowchart illustrating an example method for assigning view identifiers to views of multimedia content and presenting a maximum number of target output views of a representation as operation points. Although described with respect to source device 20 of FIG. 1, it should be understood that some or all of the elements of FIG. 7 may be performed by additional or alternative devices. For example, separate devices may assign view identifiers to views, form representations including the views, and/or provide information to destination devices in accordance with a network streaming protocol. Moreover, additional or alternative steps may be performed, and certain steps may be performed in a different order, without departing from the techniques of this disclosure.

Initially, video encoder 28 (FIG. 1) may receive raw video data for two or more views of a scene (200). Video encoder 28 may encode separate views of the video data as independent elementary video streams (202). In some examples, video encoder 28 may encode one or more views multiple times, e.g., with different encoding characteristics, such as different frame rates, bit rates, resolutions, or other different characteristics.

Video encoder 28 may pass the encoded views to encapsulation unit 30. Encapsulation unit 30 may also receive information describing horizontal locations of cameras that captured the views received form video encoder 28. Encapsulation unit 30 may determine horizontal locations of camera perspectives for the views based on the received information (204). Encapsulation unit 30 may further assign view identifiers to the views based on the locations of the camera perspectives for the views (206). In this manner, assuming that the location of a camera perspective and view identifier of a first view are known, and that the view identifier of a second view is known, a location of a camera perspective for the second view can be determined relative to the location of the camera perspective of the first view, based on the difference between the view identifiers for the first view and the second view.

Encapsulation unit 30 may form one or more representations including any or all of the encoded views (208). Furthermore, encapsulation unit 30 may determine a number of views targeted for output for each of the representations (210), and form operation points for the representations that have no more than the determined number of views for the corresponding representations (212). Encapsulation unit 30 may then form an MPD data structure including an indication of a range of the view identifiers, an indication of the ordering of the horizontal locations based on the view identifiers, and a value indicative of the maximum number of views targeted for output for each of the representations (214). The indication of the range of the view identifiers may comprise, for example, a maximum view identifier and a minimum view identifier for the representation, such that each of the representations includes a corresponding maximum view identifier and minimum view identifier in the MPD. The indication of the ordering may comprise an indication of whether increasing view identifiers corresponds to a shift from left to right or right to left for the horizontal locations of the camera perspectives for the corresponding views.

Source device 20 may receive requests from various client devices, such as destination device 40, for the MPD and/or encoded video data of the representations. In response to such requests, source device 20 may provide the MPD or video data to the requesting client devices (216). For example, source device 20 may receive HTTP Streaming requests, and respond to the requests in accordance with HTTP Streaming.

In this manner, FIG. 7 represents an example of a method of signaling information for video data, including receiving, for multimedia content, video data for two or more views of a scene, determining horizontal locations of camera perspectives for each of the two or more views, assigning view identifiers to the two or more views such that the view identifiers correspond to the relative horizontal locations of the camera perspectives, forming a representation of the multimedia content, the representation comprising a subset of the two or more views, and, in response to a request from a client device, sending information, as part of a manifest of the representation of the multimedia content, indicative of a maximum view identifier and a minimum view identifier for the representation to the client device.

FIG. 7 also represents an example of a method including receiving, for multimedia content, video data for two or more views of a scene, forming a representation of the multimedia content, the representation comprising a subset of the two or more views, and sending, to a client device, as part of a manifest of the representation of the multimedia content, information indicative of a maximum number of views in the representation that can be targeted for output.

Figure 8:
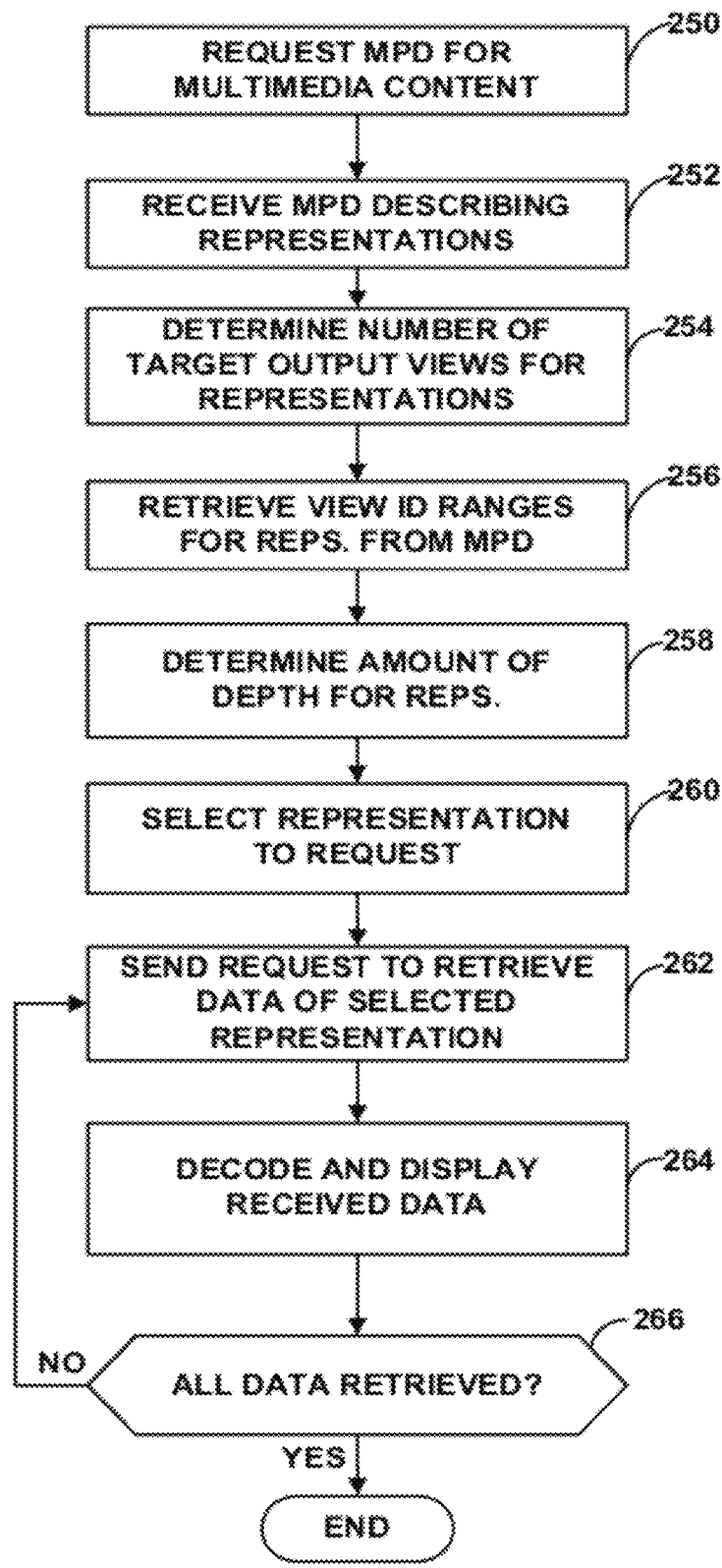
FIG. 8 is a flowchart illustrating an example of a method of receiving information for video data including view identifiers for views of multimedia content and a number of target output views of a representation as operation points.

FIG. 8 is a flowchart illustrating an example of a method of receiving information for video data including view identifiers for views of multimedia content and a maximum number of target output views of a representation as operation points. Although described with respect to destination device 40 of FIG. 1, it should be understood that some or all of the elements of FIG. 8 may be performed by additional or alternative devices. For example, separate devices may retrieve data in accordance with a network streaming protocol, decode the retrieved data, and render/display the decoded data. Moreover, additional or alternative steps may be performed, and certain steps may be performed in a different order, without departing from the techniques of this disclosure.

In the example of FIG. 8, destination device 40 initially requests an MPD for multimedia content (250). For example, destination device 40 may send a network streaming request, such as an HTTP Streaming request, to source device 20. The request may specify a URL of the multimedia content. In some examples, the request may conform to an HTTP HEAD request directed to the URL of the multimedia content.

After sending the request, destination device 40 may receive the MPD, which describes attributes of representations of the multimedia content (252). For example, the MPD may include an indication of a range for view identifiers of views included in each representation of the multimedia content. The range may comprise, for example, for each representation, an indication of the maximum view identifier and the minimum view identifier for the representation. The MPD may also indicate whether a first view identifier that is larger than a second view identifier indicates that the horizontal location of the camera perspective for the view corresponding to the first view identifier is to the left or to the right of the horizontal location of the camera perspective for the view corresponding to the second view identifier. The MPD may further describe decoding and rendering requirements, which may be specifications of minimum supported decoding and rendering capabilities of a destination device. Furthermore, the MPD may provide an indication of bitrates for the representations. The MPD may also include operation point information describing operation points of the representations, as well as maximum numbers of views targeted for output for each of the representations. In other examples, destination device 40 may send a request for, and receive after requesting, header data for a representation of multimedia content, or another data structure including signaling data for the multimedia content, such as view identifier ranges for views of a representation of the multimedia content and/or a maximum number of views targeted for output for the representation of the multimedia content.

Using the MPD, in the example of FIG. 8, destination device 40 may determine numbers of target output views (e.g., maximum numbers of target output views) for each of the representations (254). In some examples, the number of target output views may correspond to operation points of the representations. Destination device 40 may also retrieve view identifier ranges from the MPD (256). In accordance with the techniques of this disclosure, the view identifiers may generally describe relative locations of camera perspectives for the corresponding views. Therefore, using the view identifier ranges, destination device 40 may determine a relative amount of depth for each of the representations (258). For example, the relative amount of depth for a representation may correspond to the difference between the maximum view identifier and the minimum view identifier for the representation.

Destination device 40 may also determine a location of a first camera perspective for a first view relative to a location of a second camera perspective for a second view based on a difference between a first view identifier for the first view and a second view identifier for the second view. As an example, the view identifiers may be assigned according to a monotonically increasing function of the locations of the camera perspectives. Therefore, destination device 40 may use the view identifiers to determine an ordering of the camera perspectives for the views. In the example of a monotonically increasing function, by ordering the view identifiers from lowest to highest, destination device 40 will order the locations of camera perspectives for the views from left to right. In another example, where the view identifiers are assigned according to a monotonically decreasing function, by ordering the view identifiers from highest to lowest, destination device 40 will order the locations of camera perspectives for the views from left to right. The MPD may, in some examples, provide an indication of whether the view identifiers are assigned to a monotonically increasing or monotonically decreasing function of the locations of the camera perspectives for the views.

Using the determined relative amounts of depth for the representations and maximum number of views targeted for output for the representations, destination device 40 may select one of the representations of the multimedia content to request (260). Destination device 40 may select the representation based on this and other information signaled by the MPD, such as decoding and rendering requirements and bitrate. For example, destination device 40 may determine how many views video output 44 is capable of displaying and select a representation having at least that many target output views. Destination device 40 may select a representation that includes an operation point having that many views. Destination device 40 may also include configuration data indicative of decoding capabilities of video decoder 48 and rendering capabilities of video output 44, and select a representation having decoding and rendering requirements that the decoding and rendering capabilities can satisfy.

Destination device 40 may further determine an amount of network bandwidth available and select a representation having a bitrate that will not exceed the amount of network bandwidth. Moreover, destination device 40 may include configuration data describing a desired amount of depth for a representation, which may be based on, e.g., a size of a display device for destination device 40. In general, when the display device is relatively small (e.g. for a mobile device such as a cellular phone, laptop, tablet computer, and the like), less depth may be desired, whereas when the display device is relatively large (e.g., for a large-screen television), more depth may be desired.

After selecting a representation, destination device 40 may send a request to retrieve data of the selected representation (262). For example, destination device 40 may send an HTTP Get request for a media fragment of the representation. In some examples, destination device 40 may send an HTTP partial Get request, to retrieve only a portion of a media fragment of the representation. For example, destination device 40 may use HTTP partial Get requests to extract a sub-bitstream of the representation, e.g., to retrieve a particular operation point of the representation.

After receiving the data, destination device 40 may decode, render, and display the received data (264). Destination device 40 may then determine whether all data of the selected representation has been retrieved (266). If not all of the data has been retrieved ("NO" branch of 266), destination device 40 may end a subsequent request for a next media fragment of the selected representation. After all of the data has been retrieved ("YES" branch of 266), destination device 40 may end the procedure.

In some examples, destination device 40 may reevaluate the amount of available network bandwidth, and if the amount of bandwidth has changed, adaptively switch to a different representation having similar attributes except for a bitrate that can be accommodated by the newly determined amount of network bandwidth. Destination device 40 may retrieve data from the newly selected representation having a playback time immediately following the playback time of the most recently received media fragment of the previously selected representation.

In this manner, FIG. 8 represents an example of a method of receiving information for video data, including receiving information indicative of a maximum view identifier for a representation and a minimum view identifier for the representation, wherein the maximum view identifier comprises a view identifier for a first view of a scene, wherein the minimum view identifier comprises a view identifier for a second view of the scene, and wherein the representation comprises video data for two or more views including the first view and the second view, determining a maximum horizontal location of a camera perspective for the two or more views of the representation and a minimum horizontal location of a camera perspective for the two or more views of the representation based on the maximum view identifier and the minimum view identifier, wherein view identifiers for the two or more views are assigned such that the view identifiers correspond to the relative horizontal locations of the camera perspectives for the two or more views, and requesting at least a portion of the video data of the representation based at least in part on the determined maximum and minimum horizontal locations of the camera perspectives for the two or more views of the representation.

FIG. 8 also represents an example of a method of receiving information for video data, including receiving information indicative of a maximum number of views in a representation that can be targeted for output, wherein the representation comprises video data for one or more views of a scene, determining a maximum number of views that can be output by a destination device, and requesting at least a portion of the video data of the representation based at least in part on the determined maximum number of views that can be output by the destination device and the information indicative of the maximum number of views in the representation that can be targeted for output.

In one or more examples, the functions, methods, and techniques described in this disclosure may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of signaling information for video data, the method comprising:
   receiving, for multimedia content, video data for two or more views of a scene;
   determining horizontal locations of camera perspectives for each of the two or more views, wherein the two or more views includes a first view and a second view, wherein the first view corresponds to a first horizontal location of a first camera perspective and the second view corresponds to a second horizontal location of a second camera perspective;
   assigning view identifiers to the two or more views based on the relative horizontal locations of the camera perspectives, wherein assigning view identifiers to the two or more views based on the relative horizontal locations of the camera perspective comprises assigning a first view identifier to the first view and a second view identifier to the second view such that the first view identifier assigned to the first view relative to the second view identifier assigned to the second view is indicative of whether the first horizontal location of the first camera perspective corresponding to the first view is to the left of or to the right of the second horizontal location of the second camera perspective corresponding to the second view;
   forming a representation of the multimedia content, the representation comprising a subset of the two or more views; and
   sending, as a part of a manifest of the representation of the multimedia content, information indicative of a maximum view identifier and a minimum view identifier for the representation to a client device and ordering information indicative of whether the first view identifier and the second view identifier indicate that the first horizontal location of the first camera perspective corresponding to the first view is to the left of or to the right of the second horizontal location of the second camera perspective corresponding to the second view.

2. The method of claim 1,
   wherein assigning the view identifiers to the two or more views comprises setting values for the identifiers of the two or more views in accordance with a monotone increasing function of the horizontal locations of the camera perspectives for each of the two or more views, and
   wherein the ordering information includes information indicative that the assigned view identifiers of the representation increase in value as the horizontal locations of the camera perspectives for the two or more views progress from left to right.

3. The method of claim 1,
   wherein assigning the view identifiers to the two or more views comprises setting values for the identifiers of the two or more views in accordance with a monotone decreasing function of the horizontal locations of the camera perspectives for each of the two or more views, and
   wherein the ordering information includes information indicative that the assigned view identifiers of the representation decrease in value as the horizontal locations of the camera perspectives for the two or more views progress from left to right.

4. The method of claim 1, wherein sending the ordering information comprises sending the ordering information in at least one of the period level and the representation level in accordance with a network streaming protocol.

5. The method of claim 1, further comprising, in response to a selection of the representation by the client device, sending video data of the representation in accordance with streaming hypertext transfer protocol (HTTP streaming).

6. An apparatus for signaling information for video data, the apparatus comprising a processor configured to:
   receive, for multimedia content, video data for two or more views of a scene;
   determine horizontal locations of camera perspectives for each of the two or more views, wherein the two or more views includes a first view and a second view, wherein the first view corresponds to a first horizontal location of a first camera perspective and the second view corresponds to a second horizontal location of a second camera perspective;
   assign view identifiers to the two or more views based on the relative horizontal locations of the camera perspectives, wherein the processor being configured to assign the view identifiers to the two or more views based on the relative horizontal locations of the camera perspective includes the processor being configured to assign a first view identifier to the first view and a second view identifier to the second view such that the first view identifier assigned to the first view relative to the second view identifier assigned to the second view is indicative of whether the first horizontal location of the first camera perspective corresponding to the first view is to the left of or to the right of the second horizontal location of the second camera perspective corresponding to the second view;
   form a representation of the multimedia content, the representation comprising a subset of the two or more views; and
   send, as a part of a manifest of the representation of the multimedia content, information indicative of a maximum view identifier and a minimum view identifier for the representation to a client device and ordering information indicative of whether the first view identifier and the second view identifier indicate that the first horizontal location of the first camera perspective corresponding to the first view is to the left of or to the right of the second horizontal location of the second camera perspective corresponding to the second view.

7. The apparatus of claim 6, wherein the processor is configured to set values for the identifiers of the two or more views in accordance with a monotone increasing function of the horizontal locations of the camera perspectives for each of the two or more views, wherein the ordering information includes information indicative that the assigned view identifiers of the representation increase in value as the horizontal locations of the camera perspectives for the two or more views progress from left to right.

8. The apparatus of claim 6, wherein the processor is configured to set values for the identifiers of the two or more views in accordance with a monotone decreasing function of the horizontal locations of the camera perspectives for each of the two or more views, wherein the ordering information includes information indicative that the assigned view identifiers of the representation decrease in value as the horizontal locations of the camera perspectives for the two or more views progress from left to right.

9. The apparatus of claim 6, wherein the processor is configured to send the ordering information in at least one of the period level and the representation level in accordance with a network streaming protocol.

10. The apparatus of claim 6, wherein the processor is configured to, in response to a selection of the representation by the client device, send video data of the representation in accordance with streaming hypertext transfer protocol (HTTP streaming).

11. The apparatus of claim 6, wherein the apparatus comprises at least one of:
   an integrated circuit;
   a microprocessor; and
   a wireless communication device that includes the processor.

12. An apparatus for signaling information for video data, the apparatus comprising:
   means for receiving, for multimedia content, video data for two or more views of a scene;
   means for determining horizontal locations of camera perspectives for each of the two or more views, wherein the two or more views includes a first view and a second view, wherein the first view corresponds to a first horizontal location of a first camera perspective and the second view corresponds to a second horizontal location of a second camera perspective;
   means for assigning view identifiers to the two or more views based on the relative horizontal locations of the camera perspectives, wherein the means for assigning view identifiers to the two or more views based on the relative horizontal locations of the camera perspective comprises means for assigning a first view identifier to the first view and a second view identifier to the second view such that the first view identifier assigned to the first view relative to the second view identifier assigned to the second view is indicative of whether the first horizontal location of the first camera perspective corresponding to the first view is to the left of or to the right of the second horizontal location of the second camera perspective corresponding to the second view;
   means for forming a representation of the multimedia content, the representation comprising a subset of the two or more views; and
   means for sending, as a part of a manifest of the representation of the multimedia content, information indicative of a maximum view identifier and a minimum view identifier for the representation to a client device and ordering information indicative of whether the first view identifier and the second view identifier indicate that the first horizontal location of the first camera perspective corresponding to the first view is to the left of or to the right of the second horizontal location of the second camera perspective corresponding to the second view.

13. The apparatus of claim 12,
   wherein the means for assigning the view identifiers to the two or more views comprises means for setting values for the identifiers of the two or more views in accordance with a monotone increasing function of the horizontal locations of the camera perspectives for each of the two or more views, and
   wherein the ordering information includes information indicative that the assigned view identifiers of the representation increase in value as the horizontal locations of the camera perspectives for the two or more views progress from left to right.

14. The apparatus of claim 12,
   wherein the means for assigning the view identifiers to the two or more views comprises means for setting values for the identifiers of the two or more views in accordance with a monotone decreasing function of the horizontal locations of the camera perspectives for each of the two or more views, and
   wherein the ordering information includes information indicative that the assigned view identifiers of the representation decrease in value as the horizontal locations of the camera perspectives for the two or more views progress from left to right.

15. The apparatus of claim 12, wherein the means for sending the ordering information comprises means for sending the ordering information in at least one of the period level and the representation level in accordance with a network streaming protocol.

16. The apparatus of claim 12, further comprising means for sending, in response to a selection of the representation by the client device, video data of the representation in accordance with streaming hypertext transfer protocol (HTTP streaming).

17. A computer program product comprising a non-transitory computer-readable storage medium having stored thereon instructions that, when executed, cause a processor of a device for signaling information for video data to:
   receive, for multimedia content, video data for two or more views of a scene;
   determine horizontal locations of camera perspectives for each of the two or more views, wherein the two or more views includes a first view and a second view, wherein the first view corresponds to a first horizontal location of a first camera perspective and the second view corresponds to a second horizontal location of a second camera perspective;
   assign view identifiers to the two or more views based on the relative horizontal locations of the camera perspectives, wherein the instructions that cause the processor to assign the view identifiers to the two or more views based on the relative horizontal locations of the camera perspective comprise instructions that cause the processor to assign a first view identifier to the first view and a second view identifier to the second view such that the first view identifier assigned to the first view relative to the second view identifier assigned to the second view is indicative of whether the first horizontal location of the first camera perspective corresponding to the first view is to the left of or to the right of the second horizontal location of the second camera perspective corresponding to the second view;
   form a representation of the multimedia content, the representation comprising a subset of the two or more views; and
   send, as a part of a manifest of the representation of the multimedia content, information indicative of a maximum view identifier and a minimum view identifier for the representation to a client device and ordering information indicative of whether the first view identifier and the second view identifier indicate that the first horizontal location of the first camera perspective corresponding to the first view is to the left of or to the right of the second horizontal location of the second camera perspective corresponding to the second view.

18. The computer program product of claim 17,
   wherein the instructions that cause the processor to assign the view identifiers to the two or more views comprises instructions that cause the processor to set values for the identifiers of the two or more views in accordance with a monotone increasing function of the horizontal locations of the camera perspectives for each of the two or more views, and
   wherein the ordering information includes information indicative that the assigned view identifiers of the representation increase in value as the horizontal locations of the camera perspectives for the two or more views progress from left to right.

19. The computer program product of claim 17, wherein the instructions that cause the processor to assign the view identifiers to the two or more views comprises instructions that cause the processor to set values for the identifiers of the two or more views in accordance with a monotone decreasing function of the horizontal locations of the camera perspectives for each of the two or more views, and
wherein the ordering information includes information indicative that the assigned view identifiers of the representation decrease in value as the horizontal locations of the camera perspectives for the two or more views progress from left to right.

20. The computer program product of claim 17, wherein the instructions that cause the processor to send the ordering information comprises instructions that cause the processor to send the ordering information in at least one of the period level and the representation level in accordance with a network streaming protocol.

21. The computer program product of claim 17, further comprising instructions that cause the processor to, in response to a selection of the representation by the client device, send video data of the representation in accordance with streaming hypertext transfer protocol (HTTP streaming).

22. A method of receiving information for video data, the method comprising:
receiving ordering information associated with a representation of a scene, wherein the representation comprises video data for the two or more views including a first view and second view, and wherein the ordering information is indicative of whether a first horizontal location of a first camera perspective corresponding to the first view is to the left of or to the right of a second horizontal location of a second camera perspective corresponding to the second view;
receiving information indicative of a maximum view identifier for a representation and a minimum view identifier for the representation, wherein the maximum view identifier comprises the first view identifier assigned to the first view, wherein the minimum view identifier comprises the second view identifier assigned to the second view;
determining a maximum horizontal location of a camera perspective for the two or more views of the representation and a minimum horizontal location of a camera perspective for the two or more views of the representation based on the maximum view identifier and the minimum view identifier; and
requesting at least a portion of the video data of the representation based at least in part on the determined maximum and minimum horizontal locations of the camera perspectives for the two or more views of the representation.

23. The method of claim 22, wherein the portion of the video data of the representation includes the first view and the second view, the method further comprising:
receiving the first view and the second view; and
arranging the received first view and the received second view in accordance with the received ordering information.

24. The method of claim 22,
wherein the received ordering information includes information indicative that the assigned view identifiers of the representation increase in value as the horizontal locations of the camera perspectives for the two or more views progress from left to right,
wherein determining the maximum horizontal location comprises determining that the maximum horizontal location corresponds to the horizontal location of the first camera perspective for the first view of the scene based on the received ordering information, and
wherein determining the minimum horizontal location comprises determining that the minimum horizontal location corresponds to the horizontal location of the second camera perspective for the second view of the scene based on the received ordering information.

25. The method of claim 22,
wherein the received ordering information includes information indicative that the assigned view identifiers of the representation decrease in value as the horizontal locations of the camera perspectives for the two or more views progress from left to right,
wherein determining the maximum horizontal location comprises determining that the maximum horizontal location corresponds to the horizontal location of the first camera perspective for the second view of the scene based on the received ordering information, and
wherein determining the minimum horizontal location comprises determining that the minimum horizontal location corresponds to the horizontal location of the second camera perspective for the first view of the scene based on the received ordering information.

26. The method of claim 22, wherein receiving the ordering information comprises receiving the ordering information in at least one of the period level and the representation level in accordance with a network streaming protocol.

27. The method of claim 22, further comprising:
selecting the representation based on a manifest of the representation, wherein the manifest comprises the information indicative of the maximum view identifier and the minimum view identifier for the representation; and
in response to the selection, receiving video data of the representation in accordance with streaming hypertext transfer protocol (HTTP streaming).

28. An apparatus for receiving information for video data, the apparatus comprising a processor configured to:
receive ordering information associated with a representation of a scene, wherein the representation comprises video data for the two or more views including a first view and second view, and wherein the ordering information is indicative of whether a first horizontal location of a first camera perspective corresponding to the first view is to the left of or to the right of a second horizontal location of a second camera perspective corresponding to the second view;
receive information indicative of a maximum view identifier for a representation and a minimum view identifier for the representation, wherein the maximum view identifier comprises the first view identifier assigned to the first view, wherein the minimum view identifier comprises the second view identifier assigned to the second view;
determine a maximum horizontal location of a camera perspective for the two or more views of the representation and a minimum horizontal location of a camera perspective for the two or more views of the representation based on the maximum view identifier and the minimum view identifier; and request at least a portion of the video data of the representation based at least in part on the determined maximum and minimum horizontal locations of the camera perspectives for the two or more views of the representation.

29. The apparatus of claim 28, wherein the portion of the video data of the representation includes the first view and the second view, wherein the processor is configured to:
receive the first view and the second view; and
arrange the first view and the second view in accordance with the ordering information.

30. The apparatus of claim 29, wherein the ordering information includes information indicative that the assigned view identifiers of the representation increase in value as the horizontal locations of the camera perspectives for the two or more views progress from left to right, wherein the processor is configured to:
determine that the maximum horizontal location corresponds to the horizontal location of the first camera perspective for the first view of the scene based on the ordering information; and
determine that the minimum horizontal location corresponds to the horizontal location of the second camera perspective for the second view of the scene based on the ordering information.

31. The apparatus of claim 29, wherein the ordering information includes information indicative that the assigned view identifiers of the representation decrease in value as the horizontal locations of the camera perspectives for the two or more views progress from left to right, wherein the processor is configured to:
determine that the maximum horizontal location corresponds to the horizontal location of the first camera perspective for the second view of the scene based on the ordering information; and
determine that the minimum horizontal location corresponds to the horizontal location of the second camera perspective for the first view of the scene based on the ordering information.

32. The apparatus of claim 29, wherein to receive the ordering information, the processor is configured to receive the ordering information in at least one of the period level and the representation level in accordance with a network streaming protocol.

33. The apparatus of claim 28, wherein the processor is further configured to select the representation based on a manifest of the representation, wherein the manifest comprises the information indicative of the maximum view identifier and the minimum view identifier for the representation, and, in response to the selection, receive video data of the representation in accordance with streaming hypertext transfer protocol (HTTP streaming).

34. The apparatus of claim 28, wherein the apparatus comprises at least one of:
an integrated circuit;
a microprocessor; and
a wireless communication device that includes the processor.

35. An apparatus for receiving information for video data, the apparatus comprising:
means for receiving ordering information associated with a representation of a scene, wherein the representation comprises video data for the two or more views including a first view and second view, and wherein the ordering information is indicative of whether a first horizontal location of a first camera perspective corresponding to the first view is to the left of or to the right of a second horizontal location of a second camera perspective corresponding to the second view;
means for receiving information indicative of a maximum view identifier for a representation and a minimum view identifier for the representation, wherein the maximum view identifier comprises the first view identifier assigned to the first view, wherein the minimum view identifier comprises the second view identifier assigned to the second view;
means for determining a maximum horizontal location of a camera perspective for the two or more views of the representation and a minimum horizontal location of a camera perspective for the two or more views of the representation based on the maximum view identifier and the minimum view identifier; and
means for requesting at least a portion of the video data of the representation based at least in part on the determined maximum and minimum horizontal locations of the camera perspectives for the two or more views of the representation.

36. The apparatus of claim 35, wherein the portion of the video data of the representation includes the first view and the second view, the apparatus further comprising:
means for receiving the first view and the second view; and
means for arranging the received first view and the received second view in accordance with the received ordering information.

37. The apparatus of claim 36,
wherein the ordering information includes information indicative that the assigned view identifiers of the representation increase in value as the horizontal locations of the camera perspectives for the two or more views progress from left to right,
wherein the means for determining the maximum horizontal location comprises means for determining that the maximum horizontal location corresponds to the horizontal location of the first camera perspective for the first view of the scene based on the ordering information, and
wherein the means for determining the minimum horizontal location comprises means for determining that the minimum horizontal location corresponds to the horizontal location of the second camera perspective for the second view of the scene based on the ordering information.

38. The apparatus of claim 36,
wherein the ordering information includes information indicative that the assigned view identifiers of the representation decrease in value as the horizontal locations of the camera perspectives for the two or more views progress from left to right,
wherein the means for determining the maximum horizontal location comprises means for determining that the maximum horizontal location corresponds to the horizontal location of the first camera perspective for the second view of the scene based on the ordering information, and
wherein the means for determining the minimum horizontal location comprises means for determining that the minimum horizontal location corresponds to the horizontal location of the second camera perspective for the first view of the scene based on the ordering information.

39. The apparatus of claim 36, wherein the means for receiving the ordering information comprises means for receiving the ordering information in at least one of the period level and the representation level in accordance with a network streaming protocol.

40. The apparatus of claim 35, further comprising:
means for selecting the representation based on a manifest of the representation, wherein the manifest comprises the information indicative of the maximum view identifier and the minimum view identifier for the representation; and
means for receiving, in response to the selection, video data of the representation in accordance with streaming hypertext transfer protocol (HTTP streaming).

41. A computer program product comprising a non-transitory computer-readable storage medium having stored thereon instructions that, when executed, cause a processor of a device for receiving information for video data to:
receive ordering information associated with a representation of a scene, wherein the representation comprises video data for the two or more views including a first view and second view, and wherein the ordering information is indicative of whether a first horizontal location of a first camera perspective corresponding to the first view is to the left of or to the right of a second horizontal location of a second camera perspective corresponding to the second view;
receive information indicative of a maximum view identifier for a representation and a minimum view identifier for the representation, wherein the maximum view identifier comprises the first view identifier assigned to the first view, wherein the minimum view identifier comprises the second view identifier assigned to the second view;
determine a maximum horizontal location of a camera perspective for the two or more views of the representation and a minimum horizontal location of a camera perspective for the two or more views of the representation based on the maximum view identifier and the minimum view identifier; and
request at least a portion of the video data of the representation based at least in part on the determined maximum and minimum horizontal locations of the camera perspectives for the two or more views of the representation.

42. The computer program product of claim 41, wherein the portion of the video data of the representation includes the first view and the second view, the computer program product further comprising instructions that cause the processor to:
receive the first view and the second view; and
arrange the received first view and the received second view in accordance with the received ordering information.

43. The computer program product of claim 42,
wherein the ordering information includes information indicative that the assigned view identifiers of the representation increase in value as the horizontal locations of the camera perspectives for the two or more views progress from left to right,
wherein the instructions that cause the processor to determine the maximum horizontal location comprise instructions that cause the processor to determine that the maximum horizontal location corresponds to the horizontal location of the first camera perspective for the first view of the scene based on the ordering information, and
wherein the instructions that cause the processor to determine the minimum horizontal location comprise instructions that cause the processor to determine that the minimum horizontal location corresponds to the horizontal location of the second camera perspective for the second view of the scene based on the ordering information.

44. The computer program product of claim 42,
wherein the ordering information includes information indicative that the assigned view identifiers of the representation decrease in value as the horizontal locations of the camera perspectives for the two or more views progress from left to right,
wherein the instructions that cause the processor to determine the maximum horizontal location comprise instructions that cause the processor to determine that the maximum horizontal location corresponds to the horizontal location of the first camera perspective for the second view of the scene based on the ordering information, and
wherein the instructions that cause the processor to determine the minimum horizontal location comprise instructions that cause the processor to determine that the minimum horizontal location corresponds to the horizontal location of the second camera perspective for the first view of the scene based on the ordering information.

45. The computer program product of claim 42, wherein the instructions that cause the processor to receive the ordering information comprise instructions that cause the processor to receive the ordering information in at least one of the period level and the representation level in accordance with a network streaming protocol.

46. The computer program product of claim 41, further comprising instructions that cause the processor to:
select the representation based on a manifest of the representation, wherein the manifest comprises the information indicative of the maximum view identifier and the minimum view identifier for the representation; and
in response to the selection, receive video data of the representation in accordance with streaming hypertext transfer protocol (HTTP streaming).

* * * * *